United States Patent
Yano

(10) Patent No.: US 8,680,184 B2
(45) Date of Patent: Mar. 25, 2014

(54) CURABLE COMPOSITION AND CURED PRODUCT THEREOF

(75) Inventor: Ayako Yano, Takasago (JP)

(73) Assignee: Kaneka Corporation, Osaka (JP)

( * ) Notice: Subject to any disclaimer, the term of this patent is extended or adjusted under 35 U.S.C. 154(b) by 330 days.

(21) Appl. No.: 13/121,493

(22) PCT Filed: Sep. 28, 2009

(86) PCT No.: PCT/JP2009/066734
§ 371 (c)(1),
(2), (4) Date: May 4, 2011

(87) PCT Pub. No.: WO2010/035821
PCT Pub. Date: Apr. 1, 2010

(65) Prior Publication Data
US 2011/0213058 A1    Sep. 1, 2011

(30) Foreign Application Priority Data

Sep. 29, 2008 (JP) ................................. 2008-250556
Mar. 12, 2009 (JP) ................................. 2009-059761

(51) Int. Cl.
*C08K 5/49* (2006.01)

(52) U.S. Cl.
USPC ........... 524/115; 524/186; 524/188; 524/293; 524/414

(58) Field of Classification Search
USPC .......................... 524/115, 186, 188, 293, 414
See application file for complete search history.

(56) References Cited

U.S. PATENT DOCUMENTS

| 4,904,732 A | 2/1990 | Iwahara et al. |
| 2008/0188624 A1 | 8/2008 | Yano et al. |

FOREIGN PATENT DOCUMENTS

| JP | 52-073998 A | 6/1977 |
| JP | 52-73998 A | 6/1977 |
| JP | 63-006041 A | 1/1988 |
| JP | 5-039428 A | 2/1993 |
| JP | 5-117519 A | 5/1993 |
| JP | 09-012860 | * 1/1997 |
| JP | 09-012860 A | 1/1997 |
| JP | 9-012860 A | 1/1997 |
| JP | 9-118818 A | 5/1997 |
| JP | 63-6041 A | 1/1998 |
| JP | 10-251616 A | 9/1998 |
| JP | 2000-234064 A | 8/2000 |
| JP | 2000-313814 | * 11/2000 |
| JP | 2000-313814 A | 11/2000 |
| JP | 2000-345054 A | 12/2000 |
| JP | 2003-147167 A | 5/2003 |
| JP | 2003-206410 | * 7/2003 |
| JP | 2003-206410 A | 7/2003 |
| JP | 2008-050448 A | 3/2008 |
| WO | 2006/070637 A1 | 7/2006 |

OTHER PUBLICATIONS

Endo A. et al. "Plastics Haigouzai: Kiso to Ouyou," Taiseisha Ltd., Nov. 30, 1996, pp. 90-91.
International Search Report of PCT/JP2009/066734, mailing date Dec. 22, 2009.
Endo, Akisada et al.; Plastics haigozai-Kiso to Oyo—(Plastics Additives—Fundamentals and Applications-), Taiseisha Ltd., Nov. 30, 1996. pp. 90-91. (with Partial English Translation).
International Preliminary Report on Patentability (Form PCT/IB/373) of International Application No. PCT/JP2009/066734, dated May 10, 2011 with Forms PCT/ISA/237.

* cited by examiner

*Primary Examiner* — Robert D. Harlan
(74) *Attorney, Agent, or Firm* — Westerman, Hattori, Daniels & Adrian LLP

(57) ABSTRACT

The present invention provides a curable composition mainly comprising an organic polymer containing a reactive silyl group, which is free from toxic organotin catalysts so as to be environmentally friendly and maintains good surface properties after being cured. The curable composition of the present invention comprises: (A) an organic polymer having a silyl group cross-linkable by siloxane bond formation; (B) a carboxylic acid and/or a carboxylate metal salt; (C) an amine compound; and (D) a phosphorus compound having an aryl group and a melting point of 23° C. or higher.

17 Claims, No Drawings

CURABLE COMPOSITION AND CURED PRODUCT THEREOF

TECHNICAL FIELD

The present invention relates to a curable composition comprising one or more organic polymers having a silicon-containing group which has a hydroxy group or hydrolyzable group bonded to a silicon atom and can form a siloxane bond to be cross-linked (hereinafter referred to also as a "reactive silyl group").

BACKGROUND ART

Organic polymers containing at least one reactive silyl group in the molecule are known to have properties such that they are cross-linkable by siloxane bond formation accompanied by reactions such as hydrolysis of a reactive silyl group due to moisture and the like, even at room temperature, to provide rubber-like cured products.

Among these reactive silyl group-containing polymers, those polymers which have a main chain skeleton of a polyoxyalkylene polymer or a polyisobutylene polymer are disclosed in Patent Documents 1 and 2, and the like. These polymers have already been industrially produced and used in various applications such as sealants, adhesives, and coatings.

Curable compositions containing these reactive silyl group-containing organic polymers are cured with use of a silanol condensation catalyst. Common examples of the silanol condensation catalyst include organotin catalysts having a carbon-tin bond such as dibutyltin bis(acetylacetonate). In recent years, however, organotin compounds are known to be toxic, and the development of non-organotin catalysts has been desired. Patent Documents 3, 4, 5, 6, and 7 disclose tin carboxylates and other carboxylate metal salts as silanol condensation catalysts. These documents also disclose that addition of an amine compound as a promoter improves curability. In consideration of the environmental load, catalysts containing substantially no metal have also been desired, and Patent Document 8 discloses that combination use of an amine compound and a carboxylic acid provides a metal-free silanol condensation catalyst.

As disclosed in Non-Patent Document 1, phosphorus compounds containing phosphorus having an oxidation number of +3 are widely used as stabilizers for organic materials and flame retardants. However, it has not been known that these compounds suppress crystallization which occurs when curable compositions including a silyl group-containing polymer are cured. Patent Document 9 discloses an antibacterial sealant composition prepared with use of a phosphorus compound having a specific structure. However, it has not been predictable that the compound suppresses crystallization mentioned above.

Meanwhile, phosphorus plasticizers such as tricresyl phosphate are used for softening polyvinyl chloride and for providing sealants with flame retardance. In consideration of their properties, those plasticizers which are in a liquid form at room temperature, namely, ones having a melting point of lower than 23° C. are commonly used.

Patent Document 1: Japanese Kokai Publication S52-73998
Patent Document 2: Japanese Kokai Publication S63-6041
Patent Document 3: Japanese Kokai Publication H05-39428
Patent Document 4: Japanese Kokai Publication H09-12860
Patent Document 5: Japanese Kokai Publication 2000-313814
Patent Document 6: Japanese Kokai Publication 2000-345054
Patent Document 7: Japanese Kokai Publication 2003-206410
Patent Document 8: Japanese Kokai Publication H05-117519
Patent Document 9: Japanese Kokai Publication H10-251616
Non-Patent Document 1: Akisada Endo and Makoto Sudo, "Plastics Haigouzai: Kiso to Ouyou", Taiseisha Ltd., Nov. 30, 1996, pp. 90-91

SUMMARY OF THE INVENTION

The present inventor has found a problem that a curable composition containing a carboxylic acid/amine catalyst or a carboxylate metal salt/amine catalyst as a silanol catalyst gives a cured product on whose surface small crystalline particles occur a period of time after the curing. It has been known that crystallization is more likely to occur, in particular, when the amine compound as a promoter is a polyamine, especially diamine. However, it has been necessary to use a diamine to achieve a practical curing rate because a monoamine only provides a slow curing rate. Especially, a diamine having primary and tertiary amino groups provides a rapid curing rate. Hence, it has been necessary to use these compounds.

Though such curable compositions are usable as sealants, crystallization of small particles on the surface impairs the fine appearance of sealants, and therefore, the resolution thereof has been desired. An object of the present invention is to provide a curable composition comprising an organic polymer having a reactive silyl group, which is free from organotin catalysts that are considered to be harmful to the environment and human bodies, has good surface curability and adhesiveness, and has a good surface condition after being cured.

The present inventor has made intensive studies to solve the above problems, and has found out that a phosphorus compound having a specific structure can suppress the crystallization on the surface of the cured product.

Specifically, the present invention relates to:

(I) a curable composition comprising: (A) an organic polymer having a silyl group cross-linkable by siloxane bond formation; (B) a carboxylic acid and/or a carboxylate metal salt; (C) an amine compound having two or more amino groups and no reactive silyl group in one molecule; and (D) a phosphorus compound having an aryl group and a melting point of 23° C. or higher, (II) the curable composition according to (I), wherein an amount of an organotin compound is less than 0.02% by weight of the composition, (III) the curable composition according to (I) or (II), wherein the phosphorus compound (D) has two or more aryl groups, (IV) the curable composition according to any one of (I) to (III), wherein the phosphorus compound (D) has an aryl group to which a t-butyl group is bonded, (V) the curable composition according to any one of (I) to (IV), wherein the phosphorus compound (D) contains a phosphorus atom having an oxidation number of +3 or +5, (VI) the curable composition according to any one of (I) to (V), wherein the organic polymer (A) has, as a main chain skeleton, at least one polymer selected from the group consisting of a polyoxyalkylene polymer, a saturated hydrocarbon polymer, and a (meth)acrylate ester polymer, (VII) the curable composition according to (VI), wherein the polyoxyalkylene polymer is a polyoxypropylene polymer, (VIII) the curable composition according to any one of (I) to (VII), wherein the organic polymer (A) has a main chain skeleton containing a group represented by the formula (1):

$$-NR^1-C(=O)- \quad (1)$$

wherein $R^1$ is a hydrogen atom or a substituted or unsubstituted organic group, (IX) the curable composition according to any one of (I) to (VIII), wherein the organic polymer (A) is a mixture of a polyoxyalkylene polymer and a (meth)acrylate ester polymer, (X) the curable composition according to any one of (I) to (IX), wherein the component (B) is (B-1) a carboxylic acid including a quaternary carbon atom adjacent to a carbonyl group; and/or (B-2) a carboxylate metal salt including a quaternary carbon atom adjacent to a carbonyl group, (XI) the curable composition according to any one of (I) to (X), wherein the carboxylate metal salt (B-2) including a quaternary carbon atom adjacent to a carbonyl group is a tin carboxylate, (XII) the curable composition according to any one of (I) to (XI), wherein the amine compound (C) is a diamine, (XIII) the curable composition according to any one of (I) to (XII), wherein the amine compound (C) has one primary amino group and one tertiary amino group in one molecule, (XIV) a one-pack sealant, which comprises the curable composition according to any one of (I) to (XIII), (XV) a one-pack adhesive, which comprises the curable composition according to any one of (I) to (XIII), (XVI) a one-pack floor finishing adhesive, which comprises the curable composition according to any one of (I) to (XIII), and (XVII) a cured product, which is produced by curing the curable composition according to any one of (I) to (XVI).

The present invention provides a curable composition that has good curability and adhesiveness and has no crystals that occur on the surface after curing.

BEST MODE FOR CARRYING OUT THE INVENTION

The following will specifically describe the present invention.

The main chain skeleton of the organic polymer (A) having a reactive silyl group according to the present invention is not particularly limited and various polymers having different main chain skeletons may be used. The main chain skeleton preferably comprises at least one atom selected from a hydrogen atom, a carbon atom, a nitrogen atom, an oxygen atom, and a sulfur atom because the organic polymer (A) having such a main chain skeleton gives excellent curability and adhesiveness to the composition to be provided.

Specific examples thereof include: polyoxyalkylene polymers such as polyoxyethylene, polyoxypropylene, polyoxybutylene, polyoxytetramethylene, polyoxyethylene-polyoxypropylene copolymers, and polyoxypropylene-polyoxybutylene copolymers; hydrocarbon polymers such as ethylene-propylene copolymers, polyisobutylene, copolymers of isobutylene and isoprene or a like monomer, polychloroprene, polyisoprene, copolymers of isoprene or butadiene with acrylonitrile and/or styrene or a like monomer, polybutadiene, and copolymers of isoprene or butadiene with acrylonitrile and styrene or a like monomer, and hydrogenated polyolefin polymers derived from hydrogenation of these polyolefin polymers; polyester polymers obtained by condensation of a dibasic acid such as adipic acid and a glycol, and obtained by ring-opening polymerization of lactones; (meth)acrylate ester polymers obtained by radical polymerization of monomers such as ethyl(meth)acrylate and butyl(meth)acrylate; vinyl polymers obtained by radical polymerization of monomers such as (meth)acrylate ester monomers, vinyl acetate, acrylonitrile, and styrene; graft polymers obtained by polymerizing a vinyl monomer in such polymers as mentioned above; polysulfide polymers; polyamide polymers such as nylon 6 produced by ring-opening polymerization of ε-caprolactam, nylon 6/6 produced by polycondensation of hexamethylenediamine and adipic acid, nylon 6/10 produced by polycondensation of hexamethylenediamine and sebacic acid, nylon 11 produced by polycondensation of ε-aminoundecanoic acid, nylon 12 produced by ring-opening polymerization of ε-aminolaurolactam, and copolymer nylons containing multiple species of the aforementioned nylons; and polycarbonate polymers produced, for example, by polycondensation of bisphenol A and carbonyl chloride, diallyl phthalate polymers, and other like polymers.

Preferable among these are saturated hydrocarbon polymers, such as polyisobutylene, hydrogenated polyisoprene, and hydrogenated polybutadiene, polyoxyalkylene polymers, and (meth)acrylate ester polymers. This is because the organic polymer (A) having such a main chain skeleton has a relatively low glass transition temperature and the cured product to be provided is allowed to have excellent cold resistance.

Though not particularly limited, the glass transition temperature of the organic polymer (A) is preferably 20° C. or lower, more preferably 0° C. or lower, and particularly preferably −20° C. or lower. A glass transition temperature of higher than 20° C. may cause a high viscosity of the composition in winter or in cold districts to lower workability, and may lower the flexibility of the cured product to lower the elongation property. The glass transition temperature values are measured by a DSC.

Polyoxyalkylene polymers and (meth)acrylate ester polymers are particularly preferable because they are excellent in moisture permeability, depth curability when used for one-pack type compositions, and adhesiveness. Further, polyoxyalkylene polymers are most preferable. Among polyoxyalkylene polymers, polyoxypropylene polymers are particularly preferable.

In the present invention, the component (A) is an organic polymer having a reactive silyl group. The component (A) of the present invention can provide a composition excellent in curability and adhesiveness, compared to inorganic polymers having main chain skeletons of, for example, polydimethylsiloxane.

The reactive silyl group contained in the organic polymer of the present invention is a group that has a hydroxy group or hydrolyzable group bonded to a silicon atom and is cross-linkable by siloxane bond formation as a result of a reaction accelerated by a silanol condensation catalyst. Examples of the reactive silyl group include a group represented by the formula (2):

$$-SiR^2{}_{3-a}X_a \quad (2)$$

wherein $R^2$s are each independently a C1 to C20 alkyl group, a C6 to C20 aryl group, a C7 to C20 aralkyl group, or a triorganosiloxy group represented by $-OSi(R')_3$ (R's are each independently a C1 to C20 hydrocarbon group); Xs are each independently a hydroxy group or a hydrolyzable group; and "a" is an integer of 1 to 3.

The hydrolyzable group is not particularly limited, and may be any conventionally known hydrolyzable group. Specific examples thereof include a hydrogen atom, a halogen atom, an alkoxy group, an acyloxy group, a ketoxymate group, an amino group, an amido group, an acid amido group, an aminooxy group, a mercapto group, and an alkenyloxy group. Preferable among these are a hydrogen atom, an alkoxy group, an acyloxy group, a ketoxymate group, an amino group, an amido group, an aminooxy group, a mercapto group, and an alkenyloxy group. Particularly preferable is an alkoxy group as it contributes to mild hydrolysis and is easy to handle.

One silicon atom can have one to three groups selected from a hydrolyzable group or a hydroxy group bonded thereto. In the case that two or more groups selected from a hydrolyzable group or a hydroxy group are bonded to a silicon atom in the reactive silyl group, these groups may be the same as or different from each other.

The symbol "a" in the formula (2) is preferably 2 or 3 from the standpoint of curability.

Concrete examples of $R^2$ in the formula (2) include: alkyl groups such as a methyl group and an ethyl group; cycloalkyl groups such as a cyclohexyl group; aryl groups such as a phenyl group; aralkyl groups such as a benzyl group; and triorganosiloxy groups represented by —OSi(R')$_3$ wherein R's are each a group such as a methyl group or a phenyl group. Among these, a methyl group is particularly preferable.

Specific examples of the reactive silyl group include a trimethoxysilyl group, a triethoxysilyl group, a triisopropoxysilyl group, a dimethoxymethylsilyl group, diethoxymethylsilyl group, and a diisopropoxymethylsilyl group. Preferable are a trimethoxysilyl group, a triethoxysilyl group, and a dimethoxymethylsilyl group as they have high activity and contribute to good curability. Particularly preferable is a trimethoxysilyl group. Also, a dimethoxymethylsilyl group is particularly preferable in terms of storage stability. In addition, a triethoxysilyl group and a diethoxymethylsilyl group are particularly preferable because they produce ethanol as alcohol generated along with the hydrolysis reaction of the reactive silyl group, which means they have higher safety.

The reactive silyl group may be introduced by a conventionally known method. Examples thereof are listed below.

(I) An organic polymer having a functional group such as a hydroxy group in the molecule is allowed to react with an organic compound having an unsaturated group and an active group that is reactive with the functional group to provide an unsaturated group-containing organic polymer. Alternatively, the functional group-containing organic polymer is allowed to copolymerize with an unsaturated group-containing epoxy compound to provide an unsaturated group-containing organic polymer. Then, the reaction product is allowed to react with a reactive silyl group-containing hydrosilane for hydrosilylation.

(II) The unsaturated group-containing organic polymer provided through the same manner as in the method (I) is allowed to react with a compound having a mercapto group and a reactive silyl group.

(III) An organic polymer having a functional group such as a hydroxy group, an epoxy group or an isocyanate group in the molecule is allowed to react with a compound having a reactive silyl group and a functional group that is reactive with the former functional group.

Among these methods, the method (I) or the method (III) in such a mode that a hydroxy group-terminated polymer is allowed to react with a compound having an isocyanate group and a reactive silyl group is preferable as a high conversion rate can be achieved in a relatively short period of time. The method (I) is particularly preferable because the reactive silyl group-containing organic polymer produced by the method (I) is likely to provide curable compositions having a lower viscosity and thus better workability than those of curable compositions provided from the organic polymer produced by the method (III); and the organic polymer produced by the method (II) has a strong odor due to mercaptosilane.

Specific examples of the hydrosilane compound to be used in the method (I) include, but are not limited to: halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxysilanes such as methyldiacetoxysilane and phenyldiacetoxysilane; and ketoxymatesilanes such as bis (dimethylketoxymate)methylsilane and bis (cyclohexylketoxymate)methylsilane. In particular, halogenated silanes and alkoxysilanes are preferable. Especially, alkoxysilanes are most preferable as they contribute to mild hydrolysis of a curable composition to be provided and are easily handled. Of the alkoxysilanes, methyldimethoxysilane is preferable as it is easily available and contributes to high curability, storage stability, elongation property, and tensile strength of a curable composition containing an organic polymer to be provided. Particularly preferable is trimethoxysilane from the standpoints of the curability and restorability of a curable composition to be provided.

An example of the synthesis method (II) is, but not particularly limited to, a method in which a mercapto group- and reactive silyl group-containing compound is introduced into an unsaturated-bond moiety of the organic polymer by radical addition reaction in the presence of a radical initiator and/or a radical generation source. Specific examples of the mercapto group- and reactive silyl group-containing compound include, but are not limited to, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane, and mercaptomethyltriethoxysilane.

An example of the synthesis method (III) in which a hydroxy group-terminated polymer is allowed to react with an isocyanate group- and reactive silyl group-containing compound is, but not particularly limited to, a method disclosed in Japanese Kokai Publication H03-47825. Specific examples of the isocyanate group- and reactive silyl group-containing compound include, but are not limited to, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane, and isocyanatomethyldiethoxymethylsilane.

In the case of a silane compound in which three hydrolyzable groups are bonded to one silicon atom, such as trimethoxysilane, disproportionation may proceed in some cases. As the disproportionation proceeds, unstable compounds such as dimethoxysilane may be generated so as to show poor handleability. In the case of γ-mercaptopropyltrimethoxysilane and γ-isocyanatopropyltrimethoxysilane, however, such disproportionation will not proceed. Thus, the synthesis method (II) or (III) is preferable in the case that a group in which three hydrolyzable groups are bonded to one silicon atom, such as a trimethoxysilyl group, is used as the silyl group.

In contrast, such disproportionation will not proceed in the case of a silane compound represented by the formula (3):

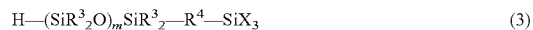

$$H—(SiR^3{}_2O)_m SiR^3{}_2—R^4—SiX_3 \qquad (3)$$

wherein Xs are as mentioned above; 2 m+2 $R^3$s are each independently a hydrocarbon group, and are each preferably a C1 to C20 hydrocarbon group, more preferably a C1 to C8 hydrocarbon group, and particularly preferably a C1 to C4 hydrocarbon group from the standpoints of the availability and cost; $R^4$ is a divalent organic group and is preferably a C1 to C12 divalent hydrocarbon group, more preferably a C2 to C8 divalent hydrocarbon group, and particularly preferably a C2 divalent hydrocarbon group from the standpoints of the availability and cost; and "m" represents an integer of 0 to 19 and is preferably 1 from the standpoints of the availability and cost. Thus, the silane compound represented by the formula (3) is preferably used in the case of introducing a group in which three hydrolyzable groups are bonded to one silicon atom in the synthesis method (I). Specific examples of the silane compound represented by the formula (3) include 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The reactive silyl group-containing organic polymer may have a linear or branched structure. The number average molecular weight thereof is about 500 to 100,000, more preferably 1,000 to 50,000, and particularly preferably 3,000 to 30,000 as determined by GPC and expressed on the polystyrene equivalent basis. If the number average molecular weight is lower than 500, the cured product to be provided is likely to be poor in elongation property. If it is higher than 100,000, the curable composition to be provided is likely to have a high viscosity and be poor in workability.

The organic polymer may contain, on average, at least 1, and preferably 1.1 to 5, reactive silyl groups per polymer molecule for providing a rubber-like cured product having high strength, high elongation, and low elastic modulus. If the polymer contains, on average, less than one reactive silyl group in one molecule, the curability may be insufficient, which makes it difficult to provide a favorable rubber elastic behavior. The reactive silyl group may be located at a main chain end, or at a side chain end, or at both ends, of the organic polymer chain. Particularly in the case that the reactive silyl group is located only at a main chain end of the molecular chain, the organic polymer component in the resulting cured product has an increased effective network size. Thus, a rubber-like cured product having high strength, high elongation, and low elastic modulus is likely to be provided.

The polyoxyalkylene polymer is essentially a polymer having a repeating unit represented by the formula (4):

$$-R^5-O- \quad (4)$$

wherein $R^5$ is a C1 to C14 linear or branched alkylene group. $R^5$ in the formula (4) preferably represents a C1 to C14, more preferably C2 to C4, linear or branched alkylene group. Specific examples of the repeating unit represented by the formula (4) include: $-CH_2O-$, $-CH_2CH_2O-$, $-CH_2CH(CH_3)O-$, $-CH_2CH(C2H_5)O-$, $-CH_2C(CH_3)_2O-$, and $-CH_2CH_2CH_2CH_2O-$. The main chain skeleton of the polyoxyalkylene polymer may comprise one kind of repeating unit, or two or more kinds of repeating units. Especially in applications such as sealants, ones including a polymer that mainly contains a propylene oxide polymer are preferable as they are amorphous and have a comparatively low viscosity.

Examples of the method for synthesizing a polyoxyalkylene polymer include, but not particularly limited to: a polymerization method with an alkali catalyst such as KOH; a polymerization method with a transition metal compound-porphyrin complex catalyst such as a complex produced by the reaction between an organoaluminum compound and porphyrin, as disclosed in Japanese Kokai Publication S61-215623; polymerization methods with a double metal cyanide complex catalyst, as disclosed in Japanese Kokai Publications S46-27250 and S59-15336 and U.S. Pat. Nos. 3,278,457, 3,278,458, 3,278,459, 3,427,256, 3,427,334 and 3,427,335, and other documents; a polymerization method with a catalyst containing a polyphosphazene salt, as disclosed in Japanese Kokai Publication H10-273512; and a polymerization method with a catalyst containing a phosphazene compound, as disclosed in Japanese Kokai Publication H11-060722.

Examples of the method for producing a polyoxyalkylene polymer containing a reactive silyl group include, but not particularly limited to: methods disclosed in Japanese Kokoku Publications S45-36319 and S46-12154, Japanese Kokai Publications S50-156599, S54-6096, S55-13767, S55-13468 and S57-164123, Japanese Kokoku Publication H03-2450, and U.S. Pat. Nos. 3,632,557, 4,345,053, 4,366,307, and 4,960,844, and other documents; and methods disclosed in Japanese Kokai Publications S61-197631, S61-215622, 561-215623, S61-218632, H03-72527, H03-47825, and H08-231707, which can provide polyoxyalkylene polymers with a high molecular weight and a narrow molecular weight distribution, namely, with a number average molecular weight of 6,000 or higher and Mw/Mn of 1.6 or less.

Each of the reactive silyl group-containing polyoxyalkylene polymers may be used alone, or a plurality of the polymers may be used in combination.

The saturated hydrocarbon polymer is a polymer that is substantially free from any carbon-carbon unsaturated bond except an aromatic ring. The polymer having such a skeleton is obtainable by (1) polymerizing a C2 to C6 olefin compound as a main monomer, such as ethylene, propylene, 1-butene or isobutylene, or by (2) homopolymerizing a diene compound such as butadiene or isoprene, or copolymerizing such a diene compound with the olefin compound, followed by hydrogenation. Here, isobutylene polymers and hydrogenated polybutadiene polymers are preferable as they allow easy introduction of functional groups at their ends, easy control of the molecular weight, and increase in the number of terminal functional groups. Isobutylene polymers are particularly preferable.

Organic polymers having a main chain skeleton of a saturated hydrocarbon polymer are excellent in heat resistance, weather resistance, durability, and moisture barrier property.

The isobutylene polymer may comprise monomer units only including isobutylene units, or alternatively, the isobutylene polymer may be a copolymer with another monomer. From the standpoint of rubber properties, the polymer preferably contains 50% by weight or more, more preferably 80% by weight or more, and particularly preferably 90 to 99% by weight, of repeating units derived from isobutylene.

Various polymerization methods have been conventionally proposed as the method for synthesizing a saturated hydrocarbon polymer. In particular, many methods of so-called living polymerization have been developed in recent years. Saturated hydrocarbon polymers, especially, isobutylene polymers, may be easily produced by inifer polymerization found by Kennedy et al. (J. P. Kennedy et al., J. Polymer Sci., Polymer Chem. Ed., 1997, Vol. 15, p. 2843). This method allows production of polymers having a molecular weight of about 500 to 100,000 at a molecular weight distribution of 1.5 or less and introduction of various functional groups to molecular ends.

Examples of the method for producing a saturated hydrocarbon polymer containing a reactive silyl group include, but are not limited to, methods disclosed in Japanese Kokoku Publications H04-69659 and H07-108928, Japanese Kokai Publications S63-254149, S64-22904 and H01-197509, Japanese Patent Nos. 2539445 and 2873395, Japanese Kokai Publication H07-53882, and other documents.

Each of the reactive silyl group-containing saturated hydrocarbon polymers may be used alone, or a plurality of the polymers may be used in combination.

The (meth)acrylate ester monomer contained in a main chain of the (meth)acrylate ester polymer is not particularly limited and various monomers may be used. Examples thereof include (meth)acrylate monomers such as (meth)acrylic acid, methyl(meth)acrylate, ethyl(meth)acrylate, n-propyl(meth)acrylate, isopropyl(meth)acrylate, n-butyl (meth)acrylate, isobutyl(meth)acrylate, tert-butyl(meth) acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth) acrylate, decyl(meth)acrylate, dodecyl(meth)acrylate, phenyl(meth)acrylate, toluoyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, γ-(methacryloyloxypropyl)dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, and (meth)acrylic acid-ethylene oxide adducts.

The (meth)acrylate ester polymers include copolymers of such a (meth)acrylate ester monomer and a vinyl monomer as mentioned below. Examples of the vinyl monomer include: styrene monomers such as styrene, vinyltoluene, α-methylstyrene, chlorostyrene, and styrenesulfonic acid and salts thereof; silyl group-containing vinyl monomers such as vinyltrimethoxysilane and vinyltriethoxysilane; maleic anhydride, maleic acid, and monoalkyl esters and dialkyl esters of maleic acid; fumaric acid, and monoalkyl esters and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amide group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, allyl alcohol, and the like.

Each of these may be used alone, or a plurality of them may be copolymerized in combination. Among these, from the standpoints of physical properties of the resulting product, the polymer is preferably a polymer containing a styrene monomer and a (meth)acrylate monomer, more preferably a (meth) acrylic polymer containing an acrylate ester monomer and a methacrylate ester monomer, and particularly preferably an acrylic polymer containing an acrylate ester monomer. For general building use, a butyl acrylate monomer is more preferably used because the composition is required to have a low viscosity and the cured product thereof is required to have physical properties such as low modulus, high elongation, high weather resistance, and high heat resistance. Meanwhile, for use that requires properties including oil resistance, such as automotive application, a copolymer mainly containing ethyl acrylate is more preferably used. The polymer mainly containing ethyl acrylate is likely to be slightly poor in low-temperature properties (cold resistance) while being excellent in oil resistance. For improving its low-temperature properties, some ethyl acrylate monomers may be replaced with butyl acrylate monomers. As the proportion of butyl acrylate increases, however, the good oil resistance is likely to be impaired. Thus, the proportion thereof is preferably 40% or lower, and more preferably 30% or lower, in the case where good oil resistance is required for use. For improving properties such as the low-temperature properties without impairing the oil resistance, it is also preferable to use a compound such as 2-methoxyethyl acrylate or 2-ethoxyethyl acrylate in which an oxygen atom is introduced into the side chain alkyl group. Here, the introduction of an alkoxy group having an ether bond in the side chain is likely to cause poor heat resistance. Thus, the proportion thereof is preferably 40% or lower in the case where good heat resistance is required for use. Thus, suitable polymers may be produced by appropriate adjustment of the proportion in consideration of required physical properties such as oil resistance, heat resistance, and low-temperature properties, based on various uses and requirements. For example, without any limitative meaning, copolymers of ethyl acrylate, butyl acrylate, and 2-methoxyethyl acrylate (weight ratio: 40-50/20-30/30-20) polymers have an excellent balance between physical properties including oil resistance, heat resistance, and low-temperature properties. In the present invention, these preferable monomers may be copolymerized, or even block-copolymerized with another monomer. In such a case, these preferable monomers are preferably contained in an amount of 40% by weight or more. Here, the term "(meth)acrylate", for example, as used herein refers to "acrylate and/or methacrylate".

The (meth)acrylate ester polymer may be produced by any method such as a conventionally known method. Here, ordinary free radical polymerization, in which a compound such as an azo compound or a peroxide is used as a polymerization initiator, is disadvantageously likely to provide a polymer generally having a molecular weight distribution value as high as not lower than 2 and a higher viscosity. Hence, the living radical polymerization is preferable in order to produce a (meth)acrylate ester polymer having a narrow molecular weight distribution and a low viscosity and having crosslinkable functional groups introduced in a high proportion into molecular chain ends.

Among "living radical polymerization methods", more preferable for producing a (meth)acrylate ester polymer containing a specific functional group is the "atom transfer radical polymerization" in which a (meth)acrylate ester polymer may be produced by polymerization in the presence of a substance such as an organic halide or sulfonyl halide compound as an initiator and a transition metal complex as a catalyst. This is because as well as having the features of the "living radical polymerization" mentioned above, the atom transfer radical polymerization provides a polymer terminally having a halogen or the like group which is relatively advantageous to functional-group exchange reactions, and gives a high degree of freedom in selecting an initiator and a catalyst. Examples of the atom transfer radical polymerization include the method described in Matyjaszewski et al., Journal of the American Chemical Society (J. Am. Chem. Soc.), 1995, vol. 117, p. 5614.

Examples of the method for producing a (meth)acrylate ester polymer containing a reactive silyl group include methods based on the free radical polymerization using a chain transfer agent, as disclosed in Japanese Kokoku Publications H03-14068 and H04-55444, Japanese Kokai Publication H06-211922, and other documents, and methods based on the atom transfer radical polymerization, as disclosed in Japanese Kokai Publication H09-272714, and other documents. However, the production method is not particularly limited to these methods.

Each of the reactive silyl group-containing (meth)acrylate ester polymers may be used alone or a plurality of the polymers may be used in combination.

Each of the aforementioned reactive silyl group-containing organic polymers may be used alone, or a plurality of the polymers may be used in combination. More specifically, an organic polymer may be used which is obtainable by blending at least two polymers selected from the group consisting of a reactive silyl group-containing polyoxyalkylene polymer, a reactive silyl group-containing saturated hydrocarbon polymer, and a reactive silyl group-containing (meth)acrylate ester polymer.

An organic polymer obtainable by blending a reactive silyl group-containing polyoxyalkylene polymer with a reactive silyl group-containing (meth)acrylate ester polymer may be produced by the methods disclosed in Japanese Kokai Publications S59-122541, S63-112642, H06-172631, and H11-116763, and other documents. However, the production method is not particularly limited thereto. As a specific example, the polymer is preferably produced by blending a reactive silyl group-containing polyoxyalkylene polymer with a copolymer containing a reactive silyl group and substantially comprising, in the molecular chain, a (meth)acrylate ester monomer unit containing a C1 to C8 alkyl group, which is represented by the formula (5):

$$—CH_2—C(R^6)(COOR^7)— \quad (5)$$

wherein $R^6$ is a hydrogen atom or a methyl group and $R^7$ is a C1 to C8 alkyl group; and a (meth)acrylate ester monomer unit containing an alkyl group with 9 or more carbon atoms, which is represented by the formula (6):

$$—CH_2—C(R^6)(COOR^8)— \quad (6)$$

wherein $R^6$ is as mentioned above and $R^8$ is an alkyl group having 9 or more carbon atoms.

Examples of $R^7$ in the formula (5) include alkyl groups having 1 to 8, preferably 1 to 4, and more preferably 1 or 2, carbon atoms, such as a methyl group, an ethyl group, a propyl group, a n-butyl group, a t-butyl group, and a 2-ethylhexyl group. Here, each of these alkyl groups as $R^7$ may be present alone, or two or more kinds of these may be present in admixture.

Examples of $R^8$ in the formula (6) include long-chain alkyl groups having 9 or more, typically 9 to 30, and preferably 10 to 20 carbon atoms, such as a lauryl group, a tridecyl group, a cetyl group, a stearyl group, and a behenyl group. Here, each of these alkyl groups as $R^8$ may be present alone, or two or more kinds of these may be present in admixture, as in the case of $R^7$.

The molecular chain of the (meth)acrylate ester polymer substantially contains monomer units of the formulae (5) and (6). Here, "substantially" means that the total amount of monomer units of the formulae (5) and (6) in the copolymer exceeds 50% by weight. The total amount of monomer units of the formulae (5) and (6) is preferably 70% by weight or more.

The abundance ratio (by weight) of the monomer unit of the formula (5) and the monomer unit of the formula (6) is preferably 95:5 to 40:60, and more preferably 90:10 to 60:40.

Examples of monomer units that may be contained in the copolymer, other than the monomer units represented by the formulae (5) and (6), include acrylic acids such as acrylic acid and methacrylic acid; amide group-containing monomers such as acrylamide, methacrylamide, N-methylolacrylamide, and N-methylolmethacrylamide, epoxy group-containing monomers such as glycidyl acrylate and glycidyl methacrylate, amino group-containing monomers such as diethylaminoethyl acrylate, diethylaminoethyl methacrylate, and aminoethyl vinyl ether; and other monomer units derived from acrylonitrile, styrene, α-methylstyrene, alkyl vinyl ether, vinyl chloride, vinyl acetate, vinyl propionate, and ethylene.

An organic polymer obtainable by blending a reactive silyl group-containing saturated hydrocarbon polymer with a reactive silyl group-containing (meth)acrylate ester polymer is disclosed, for example but not limited to, in Japanese Kokai Publications H01-168764 and 2000-186176.

Further, other organic polymers obtainable by adding a reactive silyl group-containing (meth)acrylate ester polymer may be produced by polymerization of a (meth)acrylate ester monomer in the presence of a reactive silyl group-containing organic polymer. Such production methods are specifically disclosed, for example but not limited to, in Japanese Kokai Publications S59-78223, S59-168014, S60-228516, and S60-228517.

Meanwhile, the organic polymer may contain other components such as a urethane bond-containing component in the main chain skeleton, as long as they will not greatly impair the effects of the present invention.

The urethane bond-containing component is not particularly limited, and examples thereof include a group formed by reaction between an isocyanate group and an active hydrogen group (hereinafter, also referred to as amide segment).

The amide segment is represented by the formula (7):

$$—NR^9—C(=O)— \quad (7)$$

wherein $R^9$ is an organic group or a hydrogen atom.

Specific examples of the amide segment include: a urethane group formed by reaction between an isocyanate group and a hydroxy group; a urea group formed by reaction between an isocyanate group and an amino group; and a thiourethane group formed by reaction between an isocyanate group and a mercapto group. In the present invention, examples of the group of the formula (7) also includes groups formed by reactions of active hydrogen in the urethane group, urea group, or thiourethane group with an isocyanate group.

Examples of industrially convenient production methods of an organic polymer containing an amide segment and a reactive silyl group include a production method including the steps of reacting an organic polymer having an active hydrogen-containing group at its end with an excessive amount of a polyisocyanate compound to give a polymer having an isocyanate group at the polyurethane main chain end; and thereafter or simultaneously, reacting all or a part of the isocyanate groups with the W group of a silicon compound represented by the formula (8):

$$W—R^{10}—SiR^2_{3-a}X_a \quad (8)$$

wherein $R^2$, X, and "a" are as mentioned above, $R^{10}$ is a divalent organic group and more preferably a C1 to C20 hydrocarbon group, and W is an active hydrogen-containing group selected from the group consisting of a hydroxy group, a carboxy group, a mercapto group, and a (primary or secondary) amino group. Known production methods of organic polymers related to this production method are disclosed in Japanese Kokoku Publication S46-12154 (U.S. Pat. No. 3,632,557), Japanese Kokai Publications 558-109529 (U.S. Pat. No. 4,374,237), S62-13430 (U.S. Pat. No. 4,645,816), H08-53528 (EP 0676403), H10-204144 (EP 0831108), Japanese Kohyo Publication 2003-508561 (U.S. Pat. No. 6,197,912), Japanese Kokai Publications H06-211879 (U.S. Pat.

No. 5,364,955), H10-53637 (U.S. Pat. No. 5,756,751), H11-100427, 2000-169544, 2000-169545, 2002-212415, Japanese Patent No. 3313360, U.S. Pat. Nos. 4,067,844, 3,711,445, and Japanese Kokai Publication 2001-323040, and other documents.

Examples of the above production method also include a production method of reacting an organic polymer having an active hydrogen-containing group at its end with a reactive silyl group-containing isocyanate compound represented by the formula (9):

$$O=C=N-R^{10}-SiR^2_{3-a}X_a \quad (9)$$

wherein $R^{10}$, $R^2$, X, and "a" are as mentioned above. Known production methods of organic polymers related to this production method are disclosed in Japanese Kokai Publications H11-279249 (U.S. Pat. No. 5,990,257), 2000-119365 (U.S. Pat. No. 6,046,270), S58-29818 (U.S. Pat. No. 4,345,053), H03-47825 (U.S. Pat. No. 5,068,304), H11-60724, 2002-155145, and 2002-249538, WO 03/018658, and WO 03/059981, and other documents.

Examples of the organic polymer having an active hydrogen-containing group at its end include hydroxy group-terminated oxyalkylene polymers (polyether polyols), polyacrylic polyols, polyester polyols, hydroxy group-terminated saturated hydrocarbon polymers (polyolefin polyols), polythiol compounds, and polyamine compounds. In particular, polyether polyols, polyacrylic polyols, and polyolefin polyols are preferable as they can provide organic polymers having a relatively low glass transition temperature and the cured products thereof are excellent in cold resistance. Especially, polyether polyols are particularly preferable as they provide organic polymers having good depth curability and adhesiveness, and a low viscosity to allow favorable workability. Polyacrylic polyols and saturated hydrocarbon polymers are more preferable as they provide organic polymers which have, after curing, good weather resistance and heat resistance.

As the polyether polyol, polyether polyols produced by any production methods may be used, and a preferable polyether polyol may be terminated by at least 0.7 hydroxy groups per molecular end on the average of all the molecules. Specific examples thereof include oxyalkylene polymers prepared with use of a conventional alkali metal catalyst and oxyalkylene polymers obtainable by reacting an alkylene oxide with an initiator such as a polyhydroxy compound having at least two hydroxy groups in the presence of a double metal cyanide complex or cesium.

Among polymerization methods mentioned above, polymerization methods using a double metal cyanide complex are preferable because they allow production of an oxyalkylene polymer having a lower degree of unsaturation, narrower Mw/Mn, lower viscosity, high acid resistance, and high weather resistance.

Examples of the polyacrylic polyol include polyols whose skeleton comprises a (meth)acrylic acid alkyl ester (co)polymer and whose molecule contains a hydroxy group.

The polymer may preferably be synthesized by the living radical polymerization, and more preferably the atom transfer radical polymerization as these methods allow production of a polymer having a narrow molecular weight distribution and a low viscosity. Preferable examples also include polymers obtained by the so-called SGO process in which an acrylic acid alkyl ester monomer is continuously bulk-polymerized under high-temperature and high-pressure conditions, as disclosed in Japanese Kokai Publication 2001-207157. Specific examples thereof include ARUFON UH-2000 produced by Toagosei Co., Ltd.

Specific examples of the above polyisocyanate compound include: aromatic polyisocyanates such as toluene(tolylene) diisocyanate, diphenylmethane diisocyanate, and xylylene diisocyanate; and aliphatic polyisocyanates such as isophorone diisocyanate and hexamethylene diisocyanate.

The above silicon compound of the formula (8) is not particularly limited, and specific examples thereof include: amino group-containing silanes such as γ-aminopropyltrimethoxysilane, N-β-aminoethyl)-γ-aminopropyltrimethoxysilane, (N-phenyl)-γ-aminopropyltrimethoxysilane, N-ethylaminoisobutyltrimethoxysilane, N-cyclohexylaminomethyltriethoxysilane, N-cyclohexylaminomethyldiethoxymethylsilane, and N-phenylaminomethyltrimethoxysilane; hydroxy group-containing silanes such as γ-hydroxypropyltrimethoxysilane; and mercapto group-containing silanes such as γ-mercaptopropyltrimethoxysilane. Also usable as the silicon compound of the formula (8) are Michael addition products derived from various α,β-unsaturated carbonyl compounds and primary amino group-containing silanes or Michael addition products derived from various (meth)acryloyl group-containing silanes and primary amino group-containing compounds, as disclosed in Japanese Kokai Publications H06-211879 (U.S. Pat. No. 5,364,955), H10-53637 (U.S. Pat. No. 5,756,751), H10-204144 (EP 0831108), 2000-169544, and 2000-169545.

The above reactive silyl group-containing isocyanate compound of the formula (9) is not particularly limited, and specific examples thereof include γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate, and diethoxymethylsilylmethyl isocyanate. Also usable as the reactive silyl group-containing isocyanate compound of the formula (9) are reaction products derived from the silicon compound of the formula (8) and an excessive amount of the polyisocyanate compound mentioned above, as disclosed in Japanese Kokai Publication 2000-119365 (U.S. Pat. No. 6,046,270).

The organic polymer obtainable by the aforementioned methods has a main chain skeleton containing a group represented by the formula (1):

$$-NR^1-C(=O) \quad (1)$$

wherein $R^1$ is a hydrogen atom or a substituted or unsubstituted organic group. This structure is preferable as it shows a comparatively high polarity and therefore the cured product to be provided tends to have higher strength and higher adhesiveness to a substrate.

In the present invention, a carboxylic acid (b1) and/or a carboxylate metal salt (b2) are used as the component (B). The component (B) functions as a so-called silanol condensation catalyst which may allow siloxane bond formation from a hydroxy group or hydrolizable group which is bonded to a silicon atom in the organic polymer (A).

Each of the carboxylic acid (b1) and the carboxylate metal salt (b2) may be used alone or they may be used in combination. Any of them are preferable as they have less environmental load as non-organotin catalysts. Especially, the carboxylic acid (b1) is more preferable as it is a catalyst that is substantially free from any metal. Also, the carboxylate metal salt (b2) is more preferable as its use provides a curable composition showing less curing retardation after storage compared to that obtained from the carboxylic acid (b1).

The term "carboxylic acid (b1)" is not limited to carboxylic acids and includes carboxylic acid derivatives which may produce a carboxylic acid via hydrolysis, such as carboxylic acid anhydrides, esters, amides, nitriles, and acyl chlorides. Carboxylic acids are particularly preferable as the carboxylic acid (b1) as they have a high catalytic activity.

Specific examples of the carboxylic acid (b1) include: straight-chain saturated fatty acids such as acetic acid, propionic acid, butyric acid, valeric acid, caproic acid, enanthic acid, caprylic acid, pelargonic acid, capric acid, undecanoic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, and lacceric acid; monoenoic unsaturated fatty acids such as undecylenic acid, linderic acid, tsuzuic acid, physeteric acid, myristoleic acid, 2-hexadecenoic acid, 6-hexadecenoic acid, 7-hexadecenoic acid, palmitoleic acid, petroselinic acid, oleic acid, elaidic acid, asclepic acid, vaccenic acid, gadoleic acid, gondoic acid, cetoleic acid, erucic acid, brassidic acid, selacholeic acid, ximenic acid, lumequeic acid, acrylic acid, methacrylic acid, angelic acid, crotonic acid, isocrotonic acid, and 10-undecenoic acid; polyenoic unsaturated fatty acids such as linoelaidic acid, linolic acid, 10,12-octadecadienoic acid, hiragonic acid, α-eleostearic acid, β-eleostearic acid, punicic acid, linolenic acid, 8,11,14-eicosatrienoic acid, 7,10,13-docosatrienoic acid, 4,8,11,14-hexadecatetraenoic acid, moroctic acid, stearidonic acid, arachidonic acid, 8,12,16,19-docosatetraenoic acid, 4,8,12,15,18-eicosapentaenoic acid, clupanodonic acid, nisinic acid, and docosahexaenoic acid; branched fatty acids such as 2-methylbutyric acid, isobutyric acid, 2-ethylbutyric acid, 2-ethylhexanoic acid, isovaleric acid, tuberculostearic acid, pivalic acid, neodecanoic acid, and 2-phenylbutyric acid; triple bond-containing fatty acids such as propiolic acid, tariric acid, stearolic acid, crepenynic acid, xymenynic acid, and 7-hexadecynoic acid; alicyclic carboxylic acids such as naphthenic acid, malvalic acid, sterculic acid, hydnocarpic acid, chaulmoogric acid, and gorlic acid; oxygen-containing fatty acids such as acetoacetic acid, ethoxyacetic acid, glyoxylic acid, glycolic acid, gluconic acid, sabinic acid, 2-hydroxytetradecanoic acid, ipurolic acid, 2-hydroxyhexadecanoic acid, jalapinolic acid, juniperic acid, ambrettolic acid, aleuritic acid, 2-hydroxyoctadecanoic acid, 12-hydroxyoctadecanoic acid, 18-hydroxyoctadecanoic acid, 9,10-dihydroxyoctadecanoic acid, ricinolic acid, camlolenic acid, licanic acid, pheronic acid, and cerebronic acid; and halogen-substituted monocarboxylic acids such as chloroacetic acid, 2-chloroacrylic acid, and chlorobenzoic acid. Examples of an aliphatic dicarboxylic acid include: saturated dicarboxylic acids such as adipic acid, azelaic acid, pimelic acid, suberic acid, sebacic acid, ethylmalonic acid, glutaric acid, oxalic acid, malonic acid, succinic acid, and oxydiacetic acid; and unsaturated dicarboxylic acids such as maleic acid, fumaric acid, acetylenedicarboxylic acid, and itaconic acid. Examples of an aliphatic polycarboxylic acid include tricarboxylic acids such as aconitic acid, citric acid, and isocitric acid. Examples of an aromatic carboxylic acid include: aromatic monocarboxylic acids such as benzoic acid, 9-anthracenecarboxylic acid, atrolactic acid, anisic acid, isopropylbenzoic acid, salicylic acid, and toluic acid; and aromatic polycarboxylic acids such as phthalic acid, isophthalic acid, terephthalic acid, carboxyphenylacetic acid, and pyromellitic acid. Other examples include amino acids such as alanin, leucine, threonine, asparagic acid, glutamic acid, arginine, cycleine, methionine, phenylalanine, tryptophan, and histidine.

The carboxylic acid (b1) is preferably 2-ethylhexanoic acid, octylic acid, neodecanoic acid, oleic acid, naphthenic acid, or the like, because of their easy availability, low cost, and good compatibility with the component (A).

In the case where the carboxylic acid has a high melting point (high crystallizability), the curable composition to be provided tends to have poor handleability (poor workability). Hence, the melting point of the carboxylic acid (b1) is preferably 65° C. or lower, more preferably −50° C. to 50° C., and particularly preferably −40° C. to 35° C.

Also in the case where the carboxylic acid has a large carbon number (large molecular weight), the resulting curable composition is in a solid or high-viscous liquid form to have poor handleability (poor workability). On the other hand, in the case where the carboxylic acid (b1) has a small carbon number (small molecular weight), the acid is easily vaporized by heat, which may lower the catalytic function. In particular, when the composition is thinly spread (thin-layered), vaporization by heat is great, which may significantly lower the catalytic function. Therefore, the carbon number of the carboxylic acid (b1) is preferably 2 to 20, more preferably 6 to 17, and particularly preferably 8 to 12, including the carbon of the carbonyl group.

From the standpoints of handleability (workability, viscosity), the carboxylic acid (b1) is preferably a dicarboxylic acid or monocarboxylic acid, and more preferably a monocarboxylic acid.

In addition, the carboxylic acid (b1) more preferably has a tertiary carbon (e.g., 2-ethylhexanoic acid) or a quaternary carbon (e.g., neodecanoic acid, pivalic acid) as the carbon atom adjacent to the carbonyl group because the composition is allowed to have a high curing rate. The carboxylic acid (b1) particularly preferably has a quaternary carbon as the carbon atom adjacent to the carbonyl group. When the carboxylic acid (b1) has a quaternary carbon as the carbon atom adjacent to the carbonyl group, the composition is more likely to have superior adhesiveness compared to the compositions containing other carboxylic acids.

Examples of the carboxylic acid having a quaternary carbon as the carbon atom adjacent to the carbonyl group include chain fatty acids represented by the formula (10):

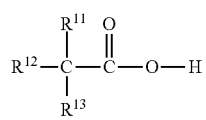

(10)

wherein $R^{11}$, $R^{12}$, and $R^{13}$ are each independently a substituted or unsubstituted monovalent hydrocarbon group and may contain a carboxyl group; and cyclic fatty acids having a structure represented by the formula (11):

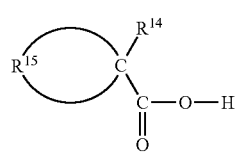

(11)

wherein $R^{14}$ is a substituted or unsubstituted monovalent hydrocarbon group and $R^{15}$ is a substituted or unsubstituted divalent hydrocarbon group, and each of them may contain a carboxyl group, or a structure represented by the formula (12):

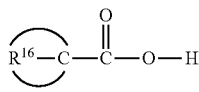

(12)

wherein $R^{16}$ is a substituted or unsubstituted trivalent hydrocarbon group and may contain a carboxyl group. Specific examples thereof include: chain monocarboxylic acids such as pivalic acid, 2,2-dimethylbutyric acid, 2-ethyl-2-methylbutyric acid, 2,2-diethylbutyric acid, 2,2-dimethylvaleric acid, 2-ethyl-2-methylvaleric acid, 2,2-diethylvaleric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid, and 2,2-dimethyl-3-hydroxypropionic acid; chain dicarboxylic acids such as dimethylmalonic acid, ehyhlmethylmalonic acid, diethylmalonic acid, 2,2-dimethylsuccinic acid, 2,2-diethylsuccinic acid, and 2,2-dimethylglutaric acid; chain tricarboxylic acids such as 3-methylisocitric acid and 4,4-dimethylaconitic acid; and cyclic carboxylic acids such as 1-methylcyclopentanecarboxylic acid, 1,2,2-trimethyl-1,3-cyclopentanedicarboxylic acid, 1-methylcyclohexanecarboxylic acid, 2-methylbicyclo[2.2.1]-5-heptene-2-carboxylic acid, 2-methyl-7-oxabicyclo[2.2.1]-5-heptene-2-carboxylic acid, 1-adamantanecarboxylic acid, bicyclo[2.2.1]heptane-1-carboxylic acid, and bicyclo[2.2.2]octane-1-carboxylic acid. Many natural materials having such structures are present and these may also be used.

Among these, from the standpoints of handleability and availability, particularly preferable are neodecanoic acid, versatic acid, 2,2-dimethyloctanoic acid, and 2-ethyl-2,5-dimethylhexanoic acid.

A single species of carboxylic acid (b1) may be used alone or two or more species may be used in combination.

Preferable examples of the carboxylate metal salt (b2) include tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, and cerium carboxylate as they have high catalytic activities. Among these, more preferable are tin carboxylate, lead carboxylate, bismuth carboxylate, titanium carboxylate, iron carboxylate, and zirconium carboxylate, and particularly preferable is tin carboxylate. Divalent tin carboxylate is most preferable.

Examples of the carboxylic acid having an acid group contained in the carboxylate metal salt (b2) include various carboxylic acids listed above as examples of the carboxylic acid (b1). As in the carboxylic acid as the component (b1), the carbon number of the carbonyl group of the component (b2) is preferably 2 to 20, more preferably 6 to 17, and particularly preferably 8 to 12, including the carbon in the carbonyl group. From the standpoints of handleability (workability, viscosity), the carboxylate metal salt is preferably a dicarboxylate metal salt or a monocarboxylate metal salt, and more preferably a monocarboxylate metal salt. In addition, the carboxylate metal salt preferably has a tertiary carbon (e.g., 2-ethylhexanoate metal salt) or a quaternary carbon (e.g., neodecanoate metal salt, pivalate metal salt) as the carbon atom adjacent to the carbonyl group because the composition is allowed to have a high curing rate. The carboxylate metal salt particularly preferably has a quaternary carbon as the carbon atom adjacent to the carbonyl group. Also from the standpoint of adhesiveness, the carboxylate metal salt preferably has a quaternary carbon as the carbon atom adjacent to the carbonyl group.

Among carboxylate metal salts (b2), more preferable are tin versatate, tin 2-ethylhexanoate, tin neodecanoate, tin pivalate and the like because the composition is allowed to have a high curing rate and its cured product is less colored.

Use of the carboxylate metal salt (b2) allows the curable composition to have good restorability, durability, and creep resistance. In addition, the use is also expected to have positive effects on water-resistant adhesiveness, adhesion durability under high-temperature and high-humidity conditions, residual tack, dust adhesion, staining, surface weather resistance, heat resistance, adhesiveness to concrete, and other properties.

A single species of carboxylate metal salt (b2) may be used alone or two or more species may be used in combination.

Each of the components (b1) and (b2) may be used alone, or both of them may be used in combination. When the carboxylic acid (b1) and the carboxylate metal salt (b2) are used in combination, the carboxylic acid (b1) is particularly preferably the same as a carboxylic acid from which the carboxylate ion of the carboxylate metal salt (b2) is derived.

The amount of the component (B) is preferably 0.01 to 20 parts by weight, more preferably 0.1 to 15 parts by weight, and particularly preferably 1 to 10 parts by weight, for each 100 parts by weight of the component (A). If the amount of the component (B) is below the above-mentioned range, the composition may fail to have a practical curing rate and the curing reaction may not proceed well. On the other hand, if the amount of the component (B) exceeds the above-mentioned range, the pot life of the composition may be so short that workability tends to be lowered, and storage stability also tends to be reduced.

In the present invention, the component (C) is an amine compound having two or more amino groups and no reactive silyl group in one molecule. The reactive silyl group used here refers to the same reactive silyl group as mentioned for the organic polymer (A) having a reactive silyl group. An amine compound having a reactive silyl group may be used in combination, but the component (C) is required to be an amine compound having no reactive silyl group in order to enhance the activity of the component (B). The component (C) enhances the catalytic activity of the component (B) so that the curable composition to be provided has improved curability.

Specific examples of the amine compound (C) include, but are not limited to: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, 1,7-diaminoheptane, 1,8-diaminooctane, 1,9-diaminononane, 1,10-diaminodecane, N-methylethylenediamine, N-ethylethylenediamine, N,N,N',N'-tetramethylethylenediamine, 3-dimethylaminopropylamine, 3-diethylaminopropylamine, 3-dipropylaminopropylamine, hydrazine, 1,1-dimethylhydrazine, 1,1-diphenylhydrazine, carbohydrazide, thiocarbohydrazide, azodicarbonamide, o-phenylenediamine, m-phenylenediamine, p-phenylenediamine, m-xylylenediamine, p,p'-biphenylenediamine, piperazine, N-methylpiperazine, 2-methylpiperazine, 4-piperidinopyridine, pyrazine, 2-methylpyrazine, 4-pyrrolidinopyridine, 1,8-diazabicyclo[5.4.0]undecene-7 (DBU), 1,5-diazabicyclo(4.3.0)nonene-5 (DBN), 1,4-diazabicyclo[2.2.2]octane (DABCO), and acetoguanamine; triamines such as 1,2,3-triaminopropane, triaminobenzene, tris(2-aminoethyl)amine, diethylenetriamine, guanidine, 1-phenylguanidine, diphenylguanidine, and melamine; tetraamines such as tetra(aminomethyl)methane, dicyandiamide, aminoguanidine, triethylenetetramine, and N,N'-bis(3-aminopropyl)piperazine; and polyamines such as tetraethylenepentamine, pentaethylenehexamine, and polyoxyalkylenepolyamines.

Among these, the component (C) is preferably a diamine compound as it enhances the activity of the component (B) so the cured product tends to have lower residual tack on the surface.

These compounds usable as the component (C) have widely different promoter activities according to factors such as the structure of component (C) itself, and compatibility with the component (A). Therefore, it is preferable to select an appropriate compound as the component (C) in accordance with the kind of the component (A) to be used. In the case of using for example a polyoxyalkylene polymer as the component (A), it is preferable to select, but not limited to, an amine compound having a primary amino group as the component (C), such as propylenediamine, N-methylethylenediamine, or 3-diethylaminopropylamine, for its high promoter activity.

In particular, it is more preferable to use a diamine having one primary amino group and one tertiary amino group in one molecule as the component (C) as it has higher promoter activity. Examples of the component (C) having such a structure include dimethylaminoethylamine, diethylaminoethylamine, 3-dimethylaminopropylamine, and 3-diethylaminopropylamine. Particularly preferable is 3-diethylaminopropylamine as it is readily available and is more likely to allow the curable composition to have good adhesiveness, workability, and storage stability.

A single species of component (C) may be used alone or two or more species may be used in combination. The amount of the amine compound (C) is preferably 0.01 to 20 parts by weight and more preferably 0.1 to 5 parts by weight for each 100 parts by weight of the organic polymer (A). If the amount of the component (C) is less than 0.01 parts by weight, the composition may fail to have a sufficient curing rate and the curing reaction may not proceed well. On the other hand, if the amount of the component (C) is more than 20 parts by weight, the composition may have so short a pot life that workability tends to be lowered, and may be likely to have reduced adhesiveness to a substrate. In addition, the composition may have a slower rather than a faster curing rate.

In the present invention, a monoamine compound other than the above-mentioned component (C) may be used in combination. Specific examples thereof include, but are not limited to: aliphatic primary amines such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines such as triamylamine, trihexylamine, and trioctylamine; aliphatic unsaturated amines such as triallylamine and oleylamine; aromatic amines such as laurylaniline, stearylaniline, and triphenylamine; and other amines such as monoethanolamine, diethanolamine, triethanolamine, 3-hydroxypropylamine, benzylamine, 3-methoxypropylamine, 3-lauryloxypropylamine, morpholine, and N-methylmorpholine.

Each of these monoamine compounds may be used alone or two or more of these may be used in combination. The amount of the monoamine is preferably 10 parts by weight or less, and more preferably 3 parts by weight or less, for each 100 parts by weight of the organic polymer (A). If the amount of the monoamine is more than 10 parts by weight, the composition may have so short a pot life that workability tends to be lowered, and may be likely to have reduced adhesiveness to a substrate. On the other hand, if the amount of the monoamine is larger than the amount of the component (C), the composition tends to have poor curability. Hence, the molar amount of the monoamine is preferably equal to or less than that of the component (C).

In the present invention, a carboxylic acid and/or a carboxylate metal salt as a curing catalyst, and an amine compound for improving the activity of the catalyst are used in combination. Here, another known silanol condensation catalyst may be used in combination as long as it will not impair the effects of the present invention. Specific examples thereof include: titanium compounds such as tetrabutyl titanate, tetrapropyl titanate, titanium tetrakis(acetylacetonate), diisopropoxytitanium bis(acetylacetonate), and diisopropoxytitanium bis(ethylacetoacetate); organotin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis(acetylacetonate), dibutyltin bis(ethylacetoacetonate), reaction products of dibutyltin oxide with silicate compounds, and reaction products of dibutyltin oxide and phthalate esters; aluminum compounds such as aluminum tris(acetylacetonate), aluminum tris(ethylacetoacetate), and diisopropoxyaluminum ethylacetoacetate; zirconium compounds such as zirconium tetrakis(acetylacetonate); metal alkoxides such as tetrabutoxyhafnium; organic acidic phosphate esters; organic sulfonic acids such as trifluoromethanesulfonic acid; and inorganic acids such as hydrochloric acid, phosphoric acid, and boronic acid. It is expected that addition of these curing catalysts enhances the catalytic activity and improves properties such as depth curability, thin-layer curability, and adhesiveness. However, the amount of organotin compound is preferably small as it is toxic. The amount of organotin compound is preferably 0.02% by weight or less of the amount of the curable composition. More preferably, the curable composition is free from any organotin compound.

Further, in consideration of the environmental load, metal compounds other than the organotin compounds, if necessary, are preferably used in a small amount.

In the present invention, the compound (D) is a phosphorus compound having an aryl group and a melting point of 23° C. or higher. In respect of a curable composition mainly containing the organic polymer (A) and also containing the components (B) and (C) as silanol condensation curing catalysts, the phosphorus compound prevents crystallization of small particles on the surface of the cured product to be provided. Further, addition of the component (D) does not adversely affect the catalytic activity, the adhesiveness of the curable composition, and other properties.

The phosphorus compound (D) is required to have a melting point of 23° C. or higher. In the case of a phosphorus compound having a melting point of lower than 23° C., the phosphorus compound mixed with the component (C) of the present invention often gives off a peculiar odor and one who handles the obtained curable composition may feel ill. The phosphorus compound having a melting point of 23° C. or higher is less likely to cause such problems and is suitably used. Also in the case of a phosphorus compound having an aryl group and a melting point of lower than 23° C., the effect of the present invention, namely, the effect of preventing crystallization, is not exerted.

Examples of the structure of the phosphorus compound having an aryl group include a structure represented by the formula (13):

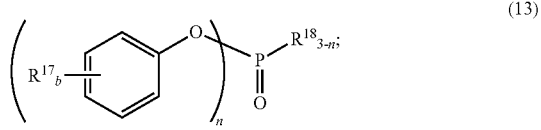

a structure represented by the formula (14):

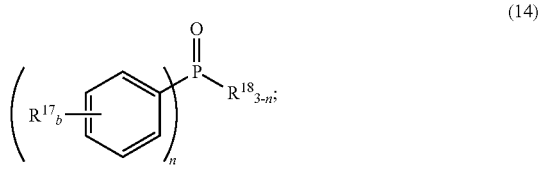

a structure represented by the formula (15):

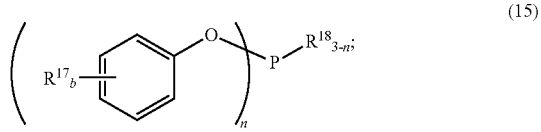

and a structure represented by the formula (16):

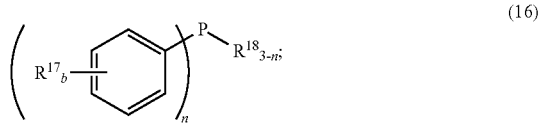

wherein each of the b $R^{17}$s is at least one selected from the group consisting of a hydrogen atom, a halogen atom, a hydroxy group, an amino group, a nitro group, a cyano group, a sulfonic acid group, and an organic group; "b" is an integer of 1 to 5; each of the 3-n $R^{18}$s is at least one selected from the group consisting of a hydrogen atom, a halogen atom, a hydroxy group, an amino group, a nitro group, a cyano group, a sulfonic acid group, and an organic group; and "n" is an integer of 1 to 3.

The component (D) is a phosphorus compound having at least one aryl group in one molecule and preferably has two or more aryl groups in order to enhance the effects. Specifically, in each of the formulae (13), (14), (15), and (16), "n" is preferably 2 or 3.

The component (D) is more preferably a phosphorus compound having an aryl group to which a t-butyl group is bonded. Among aryl groups, a 2,4-di-t-butylphenyl group is still more preferable for enhancing the effects.

Specifically, the phosphorus compound having an aryl group as the component (D) preferably contains a phosphorus atom having an oxidation number of +3 or +5. A phosphorus atom may have an oxidation number of -3, -1, +1, +3, or +5. In order to exert the effects of the present invention, the phosphorus compound preferably contains a phosphorus atom having an oxidation number of +3 or +5, and particularly preferably contains a phosphorus atom having an oxidation number of +5.

Examples of the phosphorus compound containing an aryl group and a phosphorus atom having an oxidation number of +5 include, but are not limited to, phenyl phosphate, diphenyl phosphate, triphenyl phosphate, nonyl phenyl phosphate, nonyl diphenyl phosphate, trisnonylphenyl phosphate, octyl phenyl phosphate, dioctyl phenyl phosphate, octyl diphenyl phosphate, tris(2,4-di-t-butylphenyl) phosphate, cresyl phosphate, dicresyl phosphate, cresyl phenyl phosphate, dicresyl phenyl phosphate, diethyl benzylphosphate, tri(hydroxy-methylphenyl)phosphate, sodium bis(4-tert-butylphenyl)phosphate, 3,5-di-tert-butyl-4-hydroxybenzylphosphate-diethyl ester, 1,3-bis(diphenoxyphosphonyloxy)-benzene, phenylphosphonic dichloride, benzylphosphonic dichloride, dimethyl phenylphosphonate, dimethyl benzylphosphonate, diethyl phenylphosphonate, diethyl benzylsulfonate, benzyltriphenylphosphonium chloride, diphenylphosphinous chloride, bis(benzyldiphenylphosphoranediyl)ammonium chloride, diethyl benzylphosphonate, diethyl allyl phosphonate, and diethyl(p-methylbenzyl)phosphonate.

The phosphorus compound (D) preferably has no hydroxy group in the molecule. In particular, a phosphorus compound in which a hydroxy group is directly bonded to a phosphorus atom is not preferable as it functions as a curing catalyst to have an influence on the curing rate of the curable composition of the present invention. The curing composition preferably contains not more than 0.02% by weight of phosphorus compound having a hydroxy group in the molecule, and is particularly preferably free from this compound.

In addition, a phosphonium salt having an aryl group may also be used. Examples thereof include, but are not limited to, ethyltriphenylphosphonium acetate/acetic acid complexes, ethyltriphenylphosphonium bromide, ethyltriphenylphosphonium iodide, tetraphenylphosphonium tetrakis(4-methylphenyl)borate, tetraphenylphosphonium tetraphenylborate, tetraphenylphosphonium bromide, phenylphosphonic acid, phenylphosphonic dichloride, dimethyl phenylphosphonate, n-butyltriphenylphosphonium bromide, benzyltriphenylphosphonium chloride, and methoxymethyltriphenylphosphonium chloride.

The phosphorus compound (D) of the present invention may have a ring structure with a phosphorus atom and an aryl group. Examples of a phosphorus compound having such a ring structure include, but are not limited to, 9,10-dihydro-9-oxa-10-phosphaphenanthrene-10-oxide, and sodium 2,2'-methylene bis(4,6-di-tert-butylphenyl)phosphate. Also, HCA, HCA-HQ, SANKO-BCA, M-Ester, and ME-P8 (all of these are trade names) produced by Sanko Co., Ltd. may be used.

The phosphorus compound (D) may be a polyoxyethylene alkyl phenyl ether phosphate salt which is generally used as a surfactant.

The component (D) may be a metal salt of a phosphorus compound containing an aryl group. Metal salts of phosphorus compounds are preferable because they less affect curability and do not impair storage stability. Preferable metals used for the metal salts of phosphorus compounds are alkali metals, alkaline-earth metals, and zinc. Examples of the alkali metals include sodium, potassium, and lithium. Examples of the alkaline-earth metals include calcium, magnesium, barium, and strontium. Among these, alkali metals and zinc are particularly preferable, and sodium, potassium, lithium, and zinc are more preferable. Examples of the metal salts of phosphorus compounds include, but are not limited to, disodium phenylphosphate, dipotassium phenylphosphate, dilithium phenylphosphate, sodium di(p-tolyl)phosphate, potassium di(p-tolyl)phosphate, lithium di(p-tolyl)phosphate, calcium di(p-tolyl)phosphate, sodium bis(4-tert-butylphenyl)phosphate, potassium bis(4-tert-butylphenyl) phosphate, lithium bis(4-tert-butylphenyl)phosphate, sodium 2,2'-methylene bis(4,6-di-tert-butylphenyl)phosphate, potassium 2,2'-methylene bis(4,6-di-tert-butylphenyl)phosphate, and lithium 2,2'-methylene bis(4,6-di-tert-butylphenyl)phosphate.

Among these phosphorus compounds, preferable are metal salts of phosphorus compounds represented by formula (17):

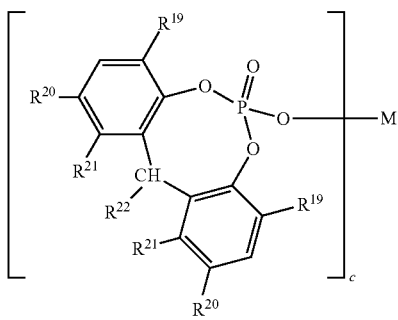

(17)

wherein each of the $R^{19}$s, $R^{20}$s, and $R^{21}$s independently represents a hydrogen atom, or a C1 to C18 linear or branched alkyl group, or a hydroxy group; $R^{22}$ represents a hydrogen atom or a methyl group; "c" represents 1 or 2; and "M" represents a hydrogen atom or an alkali metal atom in the case that "c" is 1, and "M" represents an alkaline-earth metal atom or a zinc atom in the case that "c" is 2.

Among these, preferable are metal salts of 2,2'-methylene bis(4,6-di-tert-butylphenyl)phosphate represented by the formula (18):

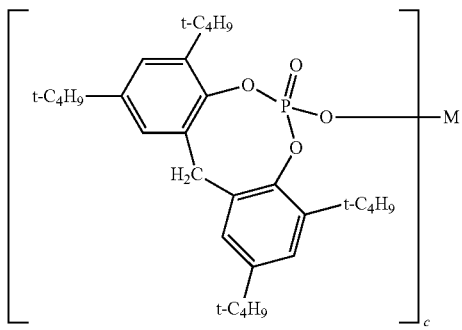

(18)

wherein "c" and M are as mentioned above. Particularly preferable are a sodium salt, an aluminum salt, a lithium salt, and a calcium salt thereof.

Among these, sodium 2,2'-methylene bis(4,6-di-tert-butylphenyl)phosphate is particularly preferable. This phosphorus compound having the following structure (19) is offered by ADEKA Corporation under the trade name T-629 and is easily available.

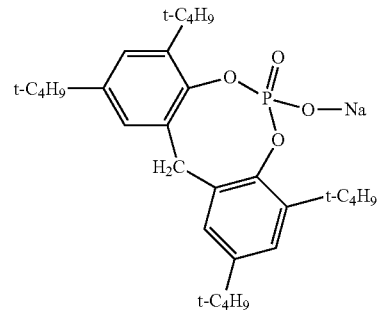

(19)

In addition, another usable compound is an aluminum or lithium salt having the same ligand as T-629.

In the present invention, also usable is a phosphorus compound containing an aryl group and a phosphorus atom having an oxidation number of +3. Examples thereof include, but are not limited to, phenyl cyclohexyl phosphite, diphenyl cyclohexyl phosphite, phenyl dicyclohexyl phosphite, methyl dicresyl phosphite, dimethyl cresyl phosphite, ethyl dicresyl phosphite, diethyl cresyl phosphite, propyl dicresyl phosphite, dipropyl cresyl phosphite, butyl dicresyl phosphite, dibutyl cresyl phosphite, 2-ethylhexyl dicresyl phosphite, di-2-ethylhexyl cresyl phosphite, tricresyl phosphite, tris(biphenyl)phosphite, tetraphenyl dipropyleneglycol diphosphite, tetraphenyl tetra(tridecyl)pentaerythritol tetraphosphite, bis(nonylphenyl)pentaerythritol diphosphite, phosphonic acid [1,1-biphenyl]-4,4'-diylbistetrakis(2,4-bis(1,1-dimethylethyl)phenyl)ester, tetraphenylphosphonium tetraphenylborate, tri-m-tolylphosphine, 4,4'-isopropylidene-diphenol dodecyl phosphine, tris(2,4-di-t-butylphenyl)phosphite, tris(biphenyl)phosphite, triphenylphosphine, triphenylphosphine oxide, 1,2-bis(diphenylphosphino)ethane, 1,4-bis(diphenylphosphino)butane, 1,3-bis(diphenylphosphino)propane, bisphenol A-bis(diphenylphosphate), 1,3-phenylene bis(dixylenylphosphate), 1,3-phenylene bis(diphenylphosphate), diphenylphosphinous chloride, diphenylphosphoryl azide, triphenylphosphine triphenylborane, distearyl pentaerythritol diphosphite, di(2,4-di-t-butylphenyl)pentaerythritol diphosphite, di(nonylphenyl)pentaerythritol diphosphite, phenyl-bisphenol A pentaerythritol diphosphite, tetramidecyl-4,4'-butylidenebis-(3-methyl-6-t-butylphenol)-di-phosphite, and hexamidecyl-1,1,3-tris(2-methyl-4-hydroxy-5-t-butylphenyl)butane triphosphite. Among these, tris(2,4-di-t-butylphenyl)phosphite is preferable as it inhibits crystallization. This compound is offered under the trade names of Irgafos 168 (produced by Ciba Japan K.K.) and Adekastab 2112 (produced by ADEKA CORPORATION) and is easily available.

A single species of component (D) may be used alone or two or more species may be used in combination. When applying the component (D), the component (D) may be dissolved or dispersed in a liquid ingredient such as a solvent or a plasticizer, or may be dispersed in a solid filler such as calcium carbonate, prior to the addition. In the case of using the solid component (D), in order to achieve the effects of the present invention, the component (D) needs to be used in the form of fine powder so as to be sufficiently dispersed in the composition.

The amount of the component (D) is preferably 1 to 20 parts by weight, more preferably 2 to 15 parts by weight, and particularly preferably 3 to 10 parts by weight, for each 100 parts by weight of the organic polymer (A). An amount of the component (D) of less than 1 part by weight may not sufficiently solve the problems arising on the surface of the cured product. On the other hand, an amount of the component (D) of more than 20 parts by weight tends to decrease adhesiveness of the cured product and is economically disadvantageous.

In the present invention, a phosphorus compound having no aryl group may be used in combination. Examples thereof include, but are not limited to, methyl phosphate, dimethyl phosphate, trimethyl phosphate, ethyl phosphate, diethyl phosphate, triethyl phosphate, propyl phosphate, dipropyl phosphate, tripropyl phosphate, butyl phosphate, dibutyl phosphate, tributyl phosphate, 2-ethylhexyl phosphate, di(2-ethylhexyl)phosphate, tri(2-ethylhexyl)phosphate, decyl phosphate, didecyl phosphate, tridecyl phosphate, dodecyl phosphate, didodecyl phosphate, tridodecyl phosphate, octadecyl phosphate, 2-chloroethyl phosphate, methylethyl phosphate, phosphoric acid mono(2-hydroxyethyl)methacryl ester, and 2-phosphonobutane-1,2,4-tricarboxylate.

Other phosphorus compounds may also be used. Examples thereof include methylphosphonic acid, ethylphosphonic acid, propylphosphonic acid, butylphosphonic acid, hexylphosphonic acid, 2-ethylhexylphosphonic acid, decylphosphonic acid, phenylphosphonic acid, benzylphosphonic acid, methylphosphonic acid dichloride, ethylphosphonic acid dichloride, propylphosphonic acid dichloride, butylphosphonic acid dichloride, hexylphosphonic acid dichloride, 2-ethylhexylphosphonic acid dichloride, decylphosphonic acid dichloride, methylphosphonic acid dimethyl ester, ethylphosphonic acid dimethyl ester, butylphosphonic acid dimethyl ester, hexylphosphonic acid dimethyl ester, 2-ethylhexylphosphonic acid dimethyl ester, methylphosphonic acid diethyl ester, ethylphosphonic acid diethyl ester, butylphosphonic acid diethyl ester, hexylphosphonic acid diethyl ester, 2-ethylhexylphosphonic acid diethyl ester, dimethylthiophosphoric acid, diethylthiophosphoric acid, dipropylthiophosphoric acid, dibutylthiophosphoric acid, dihexylthiophosphoric acid, di-2-ethylhexylthiophosphoric acid, didecylthiophosphoric acid, didodecylthiophosphoric acid, dimethylthiophosphoric acid chloride, diethylthiophosphoric acid chloride, dipropylthiophosphoric acid chloride, dibutylthiophosphoric acid chloride, dihexylthiophosphoric acid chloride, di-2-ethylhexylthiophosphoric acid chloride, ethyldiethyl phosphonoacetate, and 1-hydroxyethylidene-1,1'-diphosphoric acid melamine salt.

The curable composition of the present invention may contain a plasticizer if necessary.

Examples of the plasticizer include: phthalate esters such as bis(2-ethylhexyl)phthalate, diisodecyl phthalate, diisononyl phthalate, and butyl benzyl phthalate; non-aromatic dibasic acid esters such as dioctyl adipate, dioctyl sebacate, and isodecyl succinate; aliphatic esters such as butyl oleate and methyl acetylricinoleate; phosphate esters such as tricresyl phosphate; trimellitate esters; sulfonate esters such as phenyl hexadecanesulfonate; chlorinated paraffins; hydrocarbon oils such as alkyldiphenyls and partially hydrogenated terphenyls; process oils; and epoxy plasticizers.

Among the plasticizers, phthalate ester plasticizers may contribute to production of curable compositions having excellent curability. Preferable among the phthalate ester plasticizers are bis(2-ethylhexyl)phthalate, bis(2-propylhexyl)phthalate, diisodecyl phthalate, and diisononyl phthalate due to their easy availability. Also, a plasticizer produced by hydrogenating diisononyl phthalate is preferable because such a plasticizer has excellent safety and a low viscosity, and thus provides good workability when contained in the curable composition of the present invention. This plasticizer is offered under the trade name Hexamoll DINCH by BASF and easily available.

Examples of a polymer plasticizer include: vinyl polymers; esters of polyalkylene glycols; polyester plasticizers; polyether polyols such as polypropylene glycol; polystyrenes; polybutadiene, and polybutene.

The polymer plasticizer preferably has a number average molecular weight of 500 to 15000. The polymer plasticizer is preferably a reactive silyl group-containing polymer plasticizer because such a polymer plasticizer is involved in the curing reaction and can be prevented from transferring from the cured product to be provided. These plasticizers may be added alone, or may be added in combination.

The amount of plasticizer is preferably 5 to 150 parts by weight, more preferably 10 to 120 parts by weight, and particularly preferably 20 to 100 parts by weight, for each 100 parts by weight of the organic polymer (A).

The curable composition of the present invention may contain a silane coupling agent if necessary.

Examples of the silane coupling agent include: amino silanes such as γ-aminopropyltrimethoxysilane, γ-aminopropyltriethoxysilane, γ-(2-(2-aminoethyl)aminoethyl)aminopropyltrimethoxysilane, 3-(N-ethylamino)-2-methylpropyltrimethoxysilane, and N-phenylaminomethyltrimethoxysilane; ketimine silanes such as N-(1,3-dimethylbutylidene)-3-(triethoxysilyl)-1-propaneamine; isocyanato silanes such as γ-isocyanatopropyltrimethoxysilane; mercapto silanes such as γ-mercaptopropyltrimethoxysilane; epoxy silanes such as γ-glycidoxypropyltrimethoxysilane; carboxy silanes such as (3-carboxyethyltriethoxysilane; vinyl unsaturated group-containing silanes such as vinyltrimethoxysilane, vinyltriethoxysilane, and γ-methacryloyloxypropylmethyldimethoxysilane; halogen-containing silanes such as γ-chloropropyltrimethoxysilane; and isocyanurate silanes such as tris(3-trimethoxysilylpropyl)isocyanurate. In addition, reaction products of the amino silanes and the epoxy silanes and reaction products of the amino silanes and the isocyanurate silanes are also usable.

The amount of silane coupling agent is preferably 0.01 to 20 parts by weight for each 100 parts by weight of the organic polymer (A).

In order to produce an adhesiveness-imparting effect, the curable composition of the present invention may contain additives such as epoxy resin, phenol resin, sulfur, alkyl titanates, and aromatic polyisocyanates if necessary. The amount of these additives is preferably 5 parts by weight or less for each 100 parts by weight of the organic polymer (A).

The curable composition of the present invention may contain a filler if necessary. Examples of the filler include reinforcing fillers such as fumed silica, precipitated silica, crystalline silica, fused silica, dolomite, silicic anhydride, hydrous silicic acid, and carbon black; heavy calcium carbonate, colloidal calcium carbonate, magnesium carbonate, diatomite, clay, talc, titanium oxide, bentonite, ferric oxide, fine aluminum powder, flint powder, zinc oxide, activated zinc white, shirasu balloons, glass microballoons, organic microballoons of phenol resin or vinylidene chloride resin, and organic powders such as PVC powder and PMMA powder; and fibrous fillers such as glass fiber and filaments.

The amount of filler is preferably 1 to 250 parts by weight, and more preferably 10 to 200 parts by weight, for each 100 parts by weight of the organic polymer (A).

In order to achieve a luxurious appearance, the curable composition of the present invention may contain a scaly or granular substance. Examples of the scaly or granular substance include natural materials such as silica sand and mica, synthetic rubber, synthetic resin, and inorganic materials such as alumina. The amount of scaly or granular substance is preferably 1 to 200 parts by weight for each 100 parts by weight of the curable composition.

The curable composition of the present invention may contain a silicate if necessary. Examples of the silicate include tetraalkoxysilanes such as tetramethoxysilane, and partially hydrolyzed condensation products derived therefrom. The amount of silicate is preferably 0.1 to 20 parts by weight for each 100 parts by weight of the organic polymer (A).

The curable composition of the present invention may contain a tackifier if necessary. Examples of the tackifier resin include styrene block copolymers, and hydrogenated products thereof, phenol resins, coumarone indene resins, rosin resins, xylene resins, styrene copolymer resins, petroleum resins (such as C5 hydrocarbon resins and C9 hydrocarbon resins), hydrogenated petroleum resins, terpene resins, and DCPD petroleum resins. The amount of tackifier is preferably 5 to 1,000 parts by weight for each 100 parts by weight of the organic polymer (A).

The curable composition of the present invention may contain a solvent or a diluent if necessary. Examples of the solvent and the diluent include aliphatic hydrocarbons, aromatic hydrocarbons, alicyclic hydrocarbons, halogenated hydrocarbons, alcohols, esters, ketones, and ethers. These compounds may be added alone, or may be added in combination.

The curable composition of the present invention may contain a physical-property modifier if necessary. Preferable among physical-property modifiers are ones that generate a compound containing a monovalent silanol group in the molecule via hydrolysis because such modifiers reduce the modulus of the cured product to be provided without increasing the surface stickiness thereof. The amount of physical-property modifier is preferably 0.1 to 20 parts by weight for each 100 parts by weight of the organic polymer (A).

The curable composition of the present invention may contain a thixotropic agent if necessary. Examples of the thixotropic agent include polyamide waxes; hydrogenated castor oil derivatives; and metal soaps such as calcium stearate. Examples thereof further include powdery rubber, having a particle size of 10 to 500 μm, and organic fiber. These thixotropic agents may be added alone, or may be added in combination. The amount of thixotropic agent is preferably 0.1 to 20 parts by weight for each 100 parts by weight of the organic polymer (A).

The curable composition of the present invention may contain a compound having an epoxy group in each molecule if necessary. Such an epoxy group-containing compound enhances restorability of the cured product to be provided.

Examples of the epoxy group-containing compound include epoxidized unsaturated fats and oils, epoxidized unsaturated fatty acid esters, alicyclic epoxy compounds, compounds such as epichlorohydrin derivatives, and mixtures thereof.

The amount of epoxy compound is preferably 50 parts by weight or less for each 100 parts by weight of the organic polymer (A).

The curable composition of the present invention may contain a photocurable substance if necessary. Examples of the photocurable substance include conventionally known ones such as organic monomers, oligomers, resins, and compositions containing these substances. Specific examples thereof include unsaturated acrylic compounds, polyvinyl cinnamates, and azidized resins. The amount of photocurable substance is preferably 0.1 to 20 parts by weight for each 100 parts by weight of the organic polymer (A).

The curable composition of the present invention may contain an oxygen-curable substance if necessary. Examples of the oxygen-curable substance include drying oils such as tung oil and linseed oil, and various alkyd resins produced by modification of such compounds; drying oil-modified acrylic polymers, epoxy resins, and silicone resins; liquid polymers such as 1,2-polybutadiene, 1,4-polybutadiene, and C5-C8 diene polymers; and liquid copolymers such as NBR and SBR, which are produced by copolymerizing such a diene compound and a vinyl compound copolymerizable therewith, e.g., acrylonitrile or styrene, such that the diene compound serves as the main component. The amount of oxygen-curable substance is preferably 0.1 to 20 parts by weight for each 100 parts by weight of the organic polymer (A).

The curable composition of the present invention may contain an antioxidant if necessary. Examples of the antioxidant include hindered phenol antioxidants such as BHT. The amount of antioxidant is preferably 0.1 to 10 parts by weight for each 100 parts by weight of the organic polymer (A).

The curable composition of the present invention may contain a light stabilizer if necessary. Examples of the light stabilizer include hindered amine compounds, benzoate compounds, and salicylate compounds. Preferable among these are hindered amine light stabilizers for their high weather resistance. The amount of light stabilizer is preferably 0.1 to 10 parts by weight for each 100 parts by weight of the organic polymer (A).

The curable composition of the present invention may contain an ultraviolet absorber if necessary. Examples of the ultraviolet absorber include benzophenone compounds, benzotriazole compounds, substituted tolyl compounds, and metal chelate compounds. The amount of ultraviolet absorber is preferably 0.1 to 10 parts by weight for each 100 parts by weight of the organic polymer (A).

The curable composition of the present invention may contain an epoxy resin if necessary. The epoxy resin improves adhesiveness of the cured product to be provided, and curable compositions containing the epoxy resin can be suitably used as adhesives, especially adhesives for exterior wall tiles.

Examples of the epoxy resin include epichlorohydrin-bisphenol A epoxy resin, novolac epoxy resin, hydrogenated bisphenol A epoxy resin, alicyclic epoxy resins, N,N-diglycidylaniline, triglycidyl isocyanurate, polyalkylene glycol diglycidyl ethers, glycidyl ethers of polyalcohols such as glycerin, hydantoin epoxy resin, and epoxidized products of unsaturated polymers such as petroleum resins.

In the case that the curable composition of the present invention contains the epoxy resin, the curable composition preferably further contains a curing agent for the epoxy resin. Examples of the curing agent for the epoxy resin include primary and secondary amines such as triethylenetetramine, N-aminoethylpiperidine, m-xylylenediamine, m-phenylenediamine, isophoronediamine, and amine-terminated polyethers; tertiary amines such as 2,4,6-tris(dimethylaminomethyl)phenol, and salts of these tertiary amines; polyamide resins; imidazoles; dicyandiamides; alcohols; phenols; carboxylic acids; and diketone complex compounds of aluminum or zirconium.

Preferable among the curing agents for the epoxy resin are ketimine compounds because they allow production of one-pack type curable compositions. The ketimine compound is stable in the absence of moisture, but is decomposed into a primary amine and a ketone by moisture; the generated primary amine serves as a curing agent for curing the epoxy resin at room temperature.

The curable composition of the present invention may contain a flame retardant if necessary. Examples of the flame retardant include phosphorus-based plasticizers such as ammonium polyphosphate and tricresyl phosphate, aluminium hydroxide, and thermally expandable graphite. These flame retardants may be used alone, or may be used in combination. The amount of flame retardant is preferably 5 to 200 parts by weight for each 100 parts by weight of the component (A).

The curable composition of the present invention may contain various additives other than the aforementioned additives if necessary. Examples of the additives include curability modifiers, radical inhibitors, metal deactivators, antiozonants, phosphorus type peroxide decomposers, lubricants, pigments, blowing agents, repellents for ants, and antifungal agents. These additives may be used alone or may be used in combination.

In the case that the curable composition is of one-pack type, a formulation ingredient that contains moisture is preferably dehydrated and dried prior to the addition, or is preferably dehydrated by pressure reduction or the like operation during the blending and kneading.

In the case that the curable composition is of two-pack type, a curing catalyst is not required to be blended in the base mixture including the reactive silyl group-containing organic polymer. Thus, the composition is less likely to cure (gelate) even though some moisture exists in the formulation ingredients; if long-time storage stability is required, however, the formulation ingredients are preferably dehydrated and dried.

Preferable examples of the dehydrating or drying method include: heat drying and vacuum dehydration in the case that the formulation ingredients are solids such as powder; and vacuum dehydration, and dehydration with substances such as synthetic zeolite, silica gel, and magnesium oxide in the case that the formulation ingredients are liquids. In addition, addition of an alkoxysilane compound, an oxazolidine compound, or an isocyanate compound improves the storage stability of the curable composition. In the case of adding an alkoxysilane compound (e.g., vinyltrimethoxysilane), which can react with moisture, for the purpose of drying, the amount thereof is preferably 0.1 to 20 parts by weight for each 100 parts by weight of the organic polymer (A).

The curable composition of the present invention may be prepared by a conventionally known method. Examples thereof include a method in which the aforementioned ingredients are mixed and kneaded at room temperature or under heating with a mixer, roller, kneader or the like; and a method in which the ingredients are dissolved in a small amount of an appropriate solvent and then mixed.

The curable composition of the present invention may be suitably used in applications such as pressure-sensitive adhesives; sealants for uses such as buildings, ships, automobiles, and roads; adhesives; impression materials; vibration-proof materials; damping materials; soundproof materials; expanded/foamed materials; coating compositions; and spray coatings. The curable composition is more preferably used in such applications as sealants and adhesives.

The curable composition of the present invention may also be used in various applications such as electric and electronic part materials; elastic adhesives; contact adhesives; spray sealants; crack repair materials; tiling adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic-wave-shielding conductive materials and thermally conductive materials; hot melt materials; potting agents for electrics and electronics; films; gaskets; various molding materials; rustproof and waterproof sealants for wired glass and laminated-glass edges; and liquid sealants for use in automotive parts, electrical machinery parts, various machinery parts, and the like.

Further, the curable composition may also be used as various sealing compositions and adhesive compositions because it, either alone or with the aid of a primer, may adhere to a wide range of substrates such as glass, ceramics, wood, metals, and molded resin products.

In addition, the curable composition of the present invention may also be used as adhesives for panels, tiling adhesives, stone pitching adhesives, ceiling finishing adhesives, floor finishing adhesives, wall finishing adhesives, vehicle panel adhesives, direct glazing sealants, double glazing sealants, sealants for SSG systems, and working joint sealants for buildings.

EXAMPLES

The following will more specifically describe the present invention, referring to examples and comparative examples. Here, the present invention is not limited to these examples.

Synthesis Example 1

Propylene oxide was polymerized in the presence of a 1/1 (in weight ratio) mixture of polyoxypropylene diol having a molecular weight of about 2,000 and polyoxypropylene triol having a molecular weight of about 3,000 as an initiator and a zinc hexacyanocobaltate glyme complex catalyst to provide a polypropylene oxide having a number average molecular weight of about 19,000 (polystyrene-equivalent molecular weight determined with a TOSOH model HLC-8120 GPC solvent delivery system, a TOSOH model TSK-GEL H type column, and THF as a solvent). Thereto was added a methanol solution of NaOMe in an amount of 1.2 equivalents relative to hydroxy groups of the hydroxy group-terminated polypropylene oxide, and then the methanol was distilled off. To the residue was added allyl chloride, and thereby each terminal hydroxy group was converted to an allyl group.

The resulting unpurified allyl-terminated polypropylene oxide (100 parts by weight) was mixed with n-hexane (300 parts by weight) and water (300 parts by weight) under stirring, and then the water was removed by centrifugation. The resulting hexane solution was further mixed with water (300 parts by weight) under stirring, and the water was removed again by centrifugation. Thereafter, the hexane was removed by volatilization under reduced pressure. Thereby, an allyl group-terminated trifunctional polypropylene oxide having a number average molecular weight of about 19,000 was produced.

Using an isopropanol solution of a platinum-vinylsiloxane complex (150 ppm, platinum content: 3% by weight) as a catalyst, the produced allyl group-terminated polypropylene oxide (100 parts by weight) was reacted with methyldimethoxysilane (1.35 parts by weight) at 90° C. for two hours to provide a methyldimethoxysilyl group-terminated polypropylene oxide. As a result of $^1$H-NMR measurement by the same method as mentioned above, the introduction ratio of methyldimethoxysilyl groups into the ends was found to be about 70%. The product was referred to as a silyl group-containing organic polymer (A-1).

Synthesis Example 2

Propylene oxide was polymerized in the presence of polypropylene glycol as an initiator and a zinc hexacyanocobaltate glyme complex catalyst to provide a polypropylene oxide having a number average molecular weight of about 28,500 (polystyrene-equivalent molecular weight determined by the same method as in Synthesis Example 1). Thereto was added a methanol solution of NaOMe in an amount of 1.2 equivalents relative to hydroxy groups of the hydroxy group-terminated polypropylene oxide, and then the methanol was distilled off. To the residue was added allyl chloride, and thereby each terminal hydroxy group was converted to an allyl group.

The resulting unpurified allyl-terminated polypropylene oxide (100 parts by weight) was mixed with n-hexane (300 parts by weight) and water (300 parts by weight) under stirring, and then the water was removed by centrifugation. The resulting hexane solution was further mixed with water (300 parts by weight) under stirring, and the water was removed again by centrifugation. Thereafter, the hexane was removed by volatilization under reduced pressure. Thereby, an allyl group-terminated bifunctional polypropylene oxide having a number average molecular weight of about 28,500 was produced.

Using an isopropanol solution of a platinum-vinylsiloxane complex (150 ppm, platinum content: 3% by weight) as a catalyst, the produced allyl group-terminated polypropylene oxide (100 parts by weight) was reacted with methyldimethoxysilane (0.94 parts by weight) at 90° C. for two hours to provide a methyldimethoxysilyl group-terminated polypropylene oxide. As a result of $^1$H-NMR measurement by the same method as mentioned above, the introduction ratio of methyldimethoxysilyl groups into the ends was found to be about 78%. The product was referred to as a silyl group-containing organic polymer (A-2).

Synthesis Example 3

A mixed solution was prepared in a flask by mixing n-butyl acrylate (68.0 g), methyl methacrylate (10.0 g), stearyl methacrylate (20.0 g), 3-methacryloxypropylmethyldimethoxysilane (2.0 g), and isobutanol (23.0 g) and further dissolving azobisisobutylonitrile (0.5 g) as a polymerization initiator. Isobutanol (43.0 g) was charged into a separable flask equipped with a stirrer, a thermometer, and a nitrogen inlet and was heated to 105° C., and then nitrogen was bubbled so that the system in the flask was replaced by nitrogen. Subsequently, the above-prepared monomer mixture was dripped to the system under stirring over four hours and postpolymerization was carried out for two hours. The obtained reactive silyl group-containing acrylic polymer (A-3) was in solution in isobutanol (with solids concentration of 60%) and was found to have a number average molecular weight Mn of 18,000 as determined by GPC (as in the Synthesis Example 1) and expressed on the polystyrene equivalent basis.

Preparation Example 1

The methyldimethoxysilyl group-terminated polyoxypropylene polymer (A-2) obtained in Synthesis Example 2 and the isobutanol solution of the reactive silyl group-containing acrylic polymer (A-3) obtained in Synthesis Example 3 were mixed at a solids ratio (in weight ratio) of 70/30. The isobutanol was devolatilized from the mixture with use of a rotary evaporator under heating at 110° C. and reduced pressure so that a polymer having a solids concentration of 99% or higher was obtained. The polymer was referred to as a silyl group-containing organic polymer (A-4).

Synthesis Example 4

Copper (I) bromide (2.84 g) and acetonitrile (39 mL) were charged into a 1-L flask, and heated at 70° C. under stirring for 20 minutes under nitrogen stream. Thereto were added diethyl 2,5-dibromoadipate (5.93 g), n-butyl acrylate (254 mL), ethyl acrylate (61 mL), and stearyl acrylate (71 mL), and then the mixture was further heated at 80° C. under stirring for 20 minutes. To the mixture, pentamethyldiethylenetriamine (hereinafter, referred to as triamine) (0.41 mL) was added to start the reaction. Then, triamine (0.14 mL) was added again. The mixture was continued to be heated at 80° C. under stirring while triamine (0.14 mL) was further added. After 180 minutes from the start of the reaction, the reaction vessel was vacuumed so that the volatile content was removed. After 240 minutes from the start of the reaction, acetonitrile (118 mL), 1,7-octadiene (49 mL), and triamine (1.38 mL) were added and the mixture was continued to be heated at 80° C. under stirring. After 620 minutes from the start of the reaction, the heating was discontinued. The resulting reaction mixture was heated under reduced pressure so that the volatile content was removed, followed by dilution with toluene and filtration. The filtrate was concentrated to provide a polymer. The obtained polymer (100 parts by weight), Kyowaad 500SH (aluminum silicate, 2 parts by weight) produced by Kyowa Chemical Industry Co., Ltd., and Kyowaad 700SL (aluminum silicate, 2 parts by weight) produced by Kyowa Chemical Industry Co., Ltd. were mixed with xylene (100 parts by weight) and stirred at 130° C. After three hours, the aluminum silicate was filtered off and the filtrate was heated under reduced pressure so that the volatile content was distilled off. A Br group was removed from the copolymer by heating volatilization (reduced pressure of 10 torr or less) of the polymer at 180° C. for 12 hours. The polymer (100 parts by weight), Kyowaad 500SH (3 parts by weight), and Kyowaad 700SL (3 parts by weight) were mixed with xylene (100 parts by weight) and stirred at 130° C. After five hours, the aluminum silicate was filtered off and the filtrate was heated under reduced pressure so that the volatile content was distilled off. As a result, an alkenyl-terminated polymer was obtained. Next, the polymer (23.3 g), methyldimethoxysilane (2.55 mL), dimethyl orthoformate (0.38 mL), and a platinum catalyst were charged into a 200-mL reaction vessel made of pressure-resistant glass. Here, the amount of the platinum catalyst was $2 \times 10^{-4}$ equivalents by mole relative to alkenyl groups of the polymer. The reaction mixture was heated at 100° C. for three hours. The volatile content of the mixture was removed under reduced pressure so that a silyl group-containing organic polymer (A-5) was obtained which had a reactive silyl group at its end. The silyl group-containing organic polymer (A-5) was found to have a number average molecular weight of 27,000 as determined by GPC (on the polystyrene equivalent basis) with a molecular weight distribution of 1.3. As a result of $^1$H-NMR measurement by the same method as mentioned above, the introduction ratio of methyldimethoxysilyl groups into the ends was found to be about 80%.

Synthesis Example 5

ACCLAIM POLYOL 12200 (polypropylene glycol having a number average molecular weight of about 11,000, 100 parts by weight) produced by Sumika Bayer Urethane Co., Ltd. was mixed with γ-isocianatepropyltrimethoxysilane (3.3 parts by weight) and reacted at 90° C. for two hours in the presence of NEOSTANN U-360 (mercapto tin catalyst, 30 ppm) produced by Nitto Kasei Co., Ltd. The reaction was terminated after the disappearance of the peak (2272 cm$^{-1}$) of isocyanate group was determined by IR. As a result, a trimethoxysilyl-terminated polypropylene oxide was obtained. This silyl group-containing organic polymer (A-6) was found to have an introduction ratio of trimethoxysilyl groups into the ends of 95% as a result of $^1$H-NMR measurement (by the same method as in Synthesis Example 1).

Example 1

The silyl group-containing organic polymer (A-1) produced in Synthesis Example 1 (100 parts by weight), surface-treated colloidal calcium carbonate (120 parts by weight, trade name: HAKUENKA CCR, produced by Shiraishi Kogyo Kaisha, Ltd.), a polypropylene glycol plasticizer with a molecular weight of 3,000 (55 parts by weight, trade name: Actcol P-23, produced by Mitsui Takeda Chemicals Inc.), titanium oxide (20 parts by weight, trade name: TIPAQUE R-820, produced by Ishihara Sangyo Kaisha, Ltd.), a thixotropic agent (2 parts by weight, trade name: DISPARLON 6500, produced by Kusumoto Chemicals, Ltd.), an ultraviolet absorber (1 part by weight, trade name: TINUVIN 326, produced by Ciba Japan K.K.), a light stabilizer (1 part by weight, trade name: SANOL LS770, produced by Sankyo Lifetech Co., Ltd.), and a phosphorus compound (1 part by weight, trade name: T-629, compound name: sodium 2,2'-methylene bis(4,6-di-t-butylphenyl)phosphate, produced by ADEKA CORPORATION,) were weighed, roughly mixed with one another by means of a spatula and then the mixture was three times passed through a three-roll paint mill for sufficient dispersion, and thereby a base mixture was prepared. To the base mixture were added vinyltrimethoxysilane (2 parts by weight, trade name: A-171, produced by Momentive Performance Materials Inc.) as a dehydrating agent, γ-aminopropyltrimethoxysilane (3 parts by weight, trade name: A-1110, produced by Momentive Performance Materials Inc.) as an adhesiveness-imparting agent, and tin versatate (trade name: NEOSTANN U-50, produced by Nitto Kasei Co., Ltd.) and diethylaminopropylamine (1 part by weight, reagent produced by Wako Pure Chemical Industries, Ltd.) as silanol condensation catalysts. Then, the mixture was stirred and defoamed with a rotation and revolution mixer (trade name: THINKY MIXER ARE-250, produced by THINKY CORPORATION).

Examples 2 to 13 and Comparative Examples 1 to 16

Each preparation was carried out by the same method as in Example 1 in accordance with the ingredients and amounts as shown in Tables 1 to 3.

The following shows the used ingredients.

Versatic acid (trade name: versatic 10, produced by Japan Epoxy Resins)

Aluminum salt having T-629 structure (compound name: aluminum=bis(4,4',6,6'-tetra-t-butyl-2,2'-methylenediphenyl=phosphate)=hydroxide)

Lithium salt having T-629 structure (compound name: lithium 2,2'-methylene bis(4,6-di-t-butylphenyl)phosphate)

IRGAFOS 168 (compound name: tris(2,4-di-t-butylphenyl)phosphite, produced by Ciba Japan K.K.)

Sodium dihydrogenphosphate (reagent produced by Wako Pure Chemical Industries, Ltd.)

Disodium hydrogenphosphate (reagent produced by Wako Pure Chemical Industries, Ltd.)

Trisodium phosphate (reagent produced by Wako Pure Chemical Industries, Ltd.)

Trimethyl phosphate (trade name: TMP, produced by Daihachi Chemical Industry Co., Ltd.)

Tri(2-Ethylhexyl)phosphate (trade name: TOP, produced by Daihachi Chemical Industry Co., Ltd.)

Adekastab NPO-3 (compound name: zinc salt of long chain alkyl group-containing phosphate ester, produced by ADEKA CORPORATION)

Tricresyl phosphate (trade name: TCP, produced by Daihachi Chemical Industry Co., Ltd.)

Cresyl diphenyl phosphate (trade name: CDP, produced by Daihachi Chemical Industry Co., Ltd.)

2-Ethylhexyl diphenyl phosphate (trade name: #41, produced by Daihachi Chemical Industry Co., Ltd.)

Triphenyl phosphite (trade name: Adekastab TPP, produced by ADEKA CORPORATION)

Adekastab PEP-4C (compound name: di(nonylphenyl) pentaerythritol diphosphite, produced by ADEKA CORPORATION)

Gel All MD (compound name: bis(p-methylbenzylidene) sorbitol, produced by New Japan Chemical Co., Ltd.)

Buformin hydrochloride (reagent produced by Wako Pure Chemical Industries, Ltd.)

TABLE 1

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Silyl group-containing organic polymer (A-1) | | 100 | 100 | | | | 50 | | 100 | 100 | 100 | | 100 | |
| Silyl group-containing organic polymer (A-4) | | | | 100 | | | | | | | | | | |
| Silyl group-containing organic polymer (A-5) | | | | | 100 | | 50 | 50 | | | | 50 | | 50 |
| Silyl group-containing organic polymer (A-6) | | | | | | 100 | | 50 | | | | 50 | | 50 |
| Calcium carbonate | HAKUENKA CCR | 120 | 120 | 120 | 120 | 120 | 120 | 120 | 120 | 120 | 120 | 120 | 120 | 120 |
| Plasticizer | Actcol P-23 | 55 | 55 | 55 | 55 | 55 | 55 | 55 | 55 | 55 | 55 | 55 | 55 | 55 |
| Pigment | TIPAQUE R-820 | 20 | 20 | 20 | 20 | 20 | 20 | 20 | 20 | 20 | 20 | 20 | 20 | 20 |
| Anti-sagging agent | DISPARLON 6500 | 2 | 2 | 2 | 2 | 2 | 2 | 2 | 2 | 2 | 2 | 2 | 2 | 2 |
| Ultraviolet absorber | TINUVIN 326 | 1 | 1 | 1 | 1 | 1 | 1 | 1 | 1 | 1 | 1 | 1 | 1 | 1 |
| Light stabilizer | SANOL LS-770 | 1 | 1 | 1 | 1 | 1 | 1 | 1 | 1 | 1 | 1 | 1 | 1 | 1 |
| Dehydrating agent | Vinyltrimethoxysilane | 2 | 2 | 2 | 2 | 2 | 2 | 2 | 2 | 2 | 2 | 2 | 2 | 2 |
| Adhesiveness-imparting agent | γ-aminopropyltrimethoxysilane | 3 | 3 | 3 | 3 | 3 | 3 | 3 | 3 | 3 | 3 | 3 | 3 | 3 |
| Tin versatate | NEOSTANN U-50 | 5 | 5 | 5 | 5 | 5 | 5 | 5 | 5 | 5 | | | 5 | 5 |
| Versatic acid | Versatic 10 | | | | | | | | | | 5 | 5 | | |
| Promoter | Diethylaminopropylamine | 1 | 1 | 1 | 1 | 1 | 1 | 1 | 1 | 1 | 1 | 1 | 1 | 1 |

TABLE 1-continued

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Phosphorus compound having aryl group and melting point of 23° C. or higher | T-629 | 1 | 3 | 3 | 3 | 3 | 3 | 3 | | | 3 | 3 | | |
| | Aluminum salt having T-629 structure | | | | | | | | 3 | | | | | |
| | Lithium salt having T-629 structure | | | | | | | | | 3 | | | | |
| | IRGAFOS 168 | | | | | | | | | | | | 3 | 3 |
| Surface condition of cured product | After 7 days | good | good | good | good | good | good | good | good | good | good | good | good | good |
| | After 14 days | good | good | good | good | good | good | good | good | good | good | good | good | good |
| | After 21 days | good | good | good | good | good | good | good | good | good | good | good | good | good |
| | After 28 days | small crystals found | good | good | good | good | good | good | good | good | good | good | good | good |
| | After 56 days | small crystals found | good | good | good | good | good | good | good | good | good | good | good | good |

TABLE 2

| | | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|
| Silyl group-containing organic polymer (A-1) | | 100 | 100 | 100 | 100 | 100 | 100 | 100 | 100 |
| Calcium carbonate | HAKUENKA CCR | 120 | 120 | 120 | 120 | 120 | 120 | 120 | 120 |
| Plasticizer | Actcol P-23 | 55 | 55 | 55 | 55 | 55 | 55 | 55 | 55 |
| Pigment | TIPAQUE R-820 | 20 | 20 | 20 | 20 | 20 | 20 | 20 | 20 |
| Anti-sagging agent | DISPARLON 6500 | 2 | 2 | 2 | 2 | 2 | 2 | 2 | 2 |
| Ultraviolet absorber | TINUVIN 326 | 1 | 1 | 1 | 1 | 1 | 1 | 1 | 1 |
| Light stabilizer | SANOL LS-770 | 1 | 1 | 1 | 1 | 1 | 1 | 1 | 1 |
| Dehydrating agent | Vinyltrimethoxysilane | 2 | 2 | 2 | 2 | 2 | 2 | 2 | 2 |
| Adhesiveness-imparting agent | γ-aminopropyltrimethoxysilane | 3 | 3 | 3 | 3 | 3 | 3 | 3 | 3 |
| Tin versatate | NEOSTANN U-50 | 5 | | 5 | 5 | 5 | 5 | 5 | 5 |
| Versatic acid | Versatic 10 | | 5 | | | | | | |
| Promoter | Diethylaminopropylamine | 1 | 1 | 1 | 1 | 1 | 1 | 1 | 1 |
| Phosphorus compound having no aryl group | Sodium dihydrogenphosphate | | | 0.70 | | | | | |
| | Disodium hydrogenphosphate | | | | 0.86 | | | | |
| | Trisodium phosphate | | | | | 0.96 | | | |
| | Trimethyl phosphate | | | | | | 3 | | |
| | Tris(2-ethylhexyl) phosphate | | | | | | | 3 | |
| | Adekastab NPO-3 | | | | | | | | 3 |
| Surface condition of cured product | After 7 days | small crystals found | good | small crystals found | small crystals found | small crystals found | good | good | good |
| | After 14 days | small crystals found | small crystals found | small crystals found | small crystals found | small crystals found | small crystals found | small crystals found | small crystals found |
| | After 21 days | small crystals found | small crystals found | small crystals found | small crystals found | small crystals found | small crystals found | small crystals found | small crystals found |
| | After 28 days | small crystals found | small crystals found | small crystals found | small crystals found | small crystals found | small crystals found | small crystals found | small crystals found |
| | After 56 days | small crystals found | small crystals found | small crystals found | small crystals found | small crystals found | small crystals found | small crystals found | small crystals found |

TABLE 3

| | | Comparative example 9 | Comparative example 10 | Comparative example 11 | Comparative example 12 | Comparative example 13 | Comparative example 14 | Comparative example 15 | Comparative example 16 |
|---|---|---|---|---|---|---|---|---|---|
| Silyl group-containing organic polymer (A-1) | | 100 | 100 | 100 | 100 | 100 | 100 | 100 | 100 |
| Calcium carbonate | HAKUENKA CCR | 120 | 120 | 120 | 120 | 120 | 120 | 120 | 120 |
| Plasticizer | Actcol P-23 | 55 | 55 | 55 | 55 | 55 | 55 | 55 | 55 |
| Pigment | TIPAQUE R-820 | 20 | 20 | 20 | 20 | 20 | 20 | 20 | 20 |
| Anti-sagging agent | DISPARLON 6500 | 2 | 2 | 2 | 2 | 2 | 2 | 2 | 2 |
| Ultraviolet absorber | TINUVIN 326 | 1 | 1 | 1 | 1 | 1 | 1 | 1 | 1 |

TABLE 3-continued

|  |  | Comparative example 9 | Comparative example 10 | Comparative example 11 | Comparative example 12 | Comparative example 13 | Comparative example 14 | Comparative example 15 | Comparative example 16 |
|---|---|---|---|---|---|---|---|---|---|
| Light stabilizer | SANOL LS-770 | 1 | 1 | 1 | 1 | 1 | 1 | 1 | 1 |
| Dehydrating agent | Vinyltrimethoxysilane | 2 | 2 | 2 | 2 | 2 | 2 | 2 | 2 |
| Adhesiveness-imparting agent | γ-aminopropyltrimethoxysilane | 3 | 3 | 3 | 3 | 3 | 3 | 3 | 3 |
| Tin versatate | NEOSTANN U-50 | 5 |  | 5 | 5 | 5 | 5 | 5 | 5 |
| Versatic acid | Versatic 10 |  | 5 |  |  |  |  |  |  |
| Promoter | Diethylaminopropylamine | 1 | 1 | 1 | 1 | 1 | 1 | 1 | 1 |
| Phosphorus compound having aryl group and melting point of lower than 23° C. | Tricresyl phosphate | 3 | 3 |  |  |  |  |  |  |
|  | Cresyl diphenyl phosphate |  |  | 3 |  |  |  |  |  |
|  | 2-Ethylhexyl diphenyl phosphate |  |  |  | 3 |  |  |  |  |
|  | Triphenyl phosphite |  |  |  |  | 3 |  |  |  |
|  | Adekastab PEP-4C |  |  |  |  |  | 3 |  |  |
| Nucleator | Gel All MD |  |  |  |  |  |  | 1 |  |
|  | Buformin hydrochloride |  |  |  |  |  |  |  | 1 |
| Surface condition of cured product | After 7 days | good | good | good | good | good | small crystals found | small crystals found | small crystals found |
|  | After 14 days | small crystals found | small crystals found | small crystals found | small crystals found | small crystals found | small crystals found | small crystals found | small crystals found |
|  | After 21 days | small crystals found | small crystals found | small crystals found | small crystals found | small crystals found | small crystals found | small crystals found | small crystals found |
|  | After 28 days | small crystals found | small crystals found | small crystals found | small crystals found | small crystals found | small crystals found | small crystals found | small crystals found |
|  | After 56 days | small crystals found | small crystals found | small crystals found | small crystals found | small crystals found | small crystals found | small crystals found | small crystals found |

Example 14

The silyl group-containing organic polymer (A-1) produced in Synthesis Example 1 (100 parts by weight), surface-treated colloidal calcium carbonate (120 parts by weight, trade name: HAKUENKA CCR, produced by Shiraishi Kogyo Kaisha, Ltd.), a polypropylene glycol plasticizer with a molecular weight of 3,000 (55 parts by weight, trade name: Actcol P-23, produced by Mitsui Takeda Chemicals Inc.), titanium oxide (20 parts by weight, trade name: TIPAQUE R-820, produced by Ishihara Sangyo Kaisha, Ltd.), a thixotropic agent (2 parts by weight, trade name: DISPARLON 6500, produced by Kusumoto Chemicals, Ltd.), an ultraviolet absorber (1 part by weight, trade name: TINUVIN 326, produced by Ciba Japan K.K.), a light stabilizer (1 part by weight, trade name: SANOL LS770, produced by Sankyo Lifetech Co., Ltd.), and a phosphorus compound in an amount as shown in Table 4 were weighed, roughly mixed with one another by means of a spatula, and then the mixture was three times passed through a three-roll paint mill for sufficient dispersion. The mixture was then dehydrated under reduced pressure at 120° C. for two hours and cooled to 50° C. or lower. The resulting mixture was mixed with vinyltrimethoxysilane (2 parts by weight, trade name: A-171, produced by Momentive Performance Materials Inc.) as a dehydrating agent, and γ-aminopropyltrimethoxysilane (3 parts by weight, trade name: A-1110, produced by Momentive Performance Materials Inc.) as an adhesiveness-imparting agent. Then, tin versatate (trade name: NEOSTANN U-50, produced by Nitto Kasei Co., Ltd.) and diethylaminopropylamine (1 part by weight, reagent produced by Wako Pure Chemical Industries, Ltd.) as silanol condensation catalysts were added thereto and the mixture was kneaded in the presence of substantially no moisture. The resulting composition was enclosed in a cartridge as a dampproof vessel. Thus, a one-pack type curable composition was obtained.

Examples 15 and 16 and Comparative Example 17

Each preparation was carried out by the same method as in Example 14 in accordance with the ingredients and amounts as shown in Table 4 to provide a one-pack type curable composition.

TABLE 4

|  |  | Example 14 | Example 15 | Example 16 | Comparative example 17 |
|---|---|---|---|---|---|
| Silyl group-containing organic polymer (A-1) |  | 100 | 100 | 100 | 100 |
| Calcium carbonate | HAKUENKA CCR | 120 | 120 | 120 | 120 |
| Plasticizer | Actcol P-23 | 55 | 55 | 55 | 55 |
| Pigment | TIPAQUE R-820 | 20 | 20 | 20 | 20 |
| Anti-sagging agent | DISPARLON 6500 | 2 | 2 | 2 | 2 |
| Ultraviolet absorber | TINUVIN 326 | 1 | 1 | 1 | 1 |
| Light stabilizer | SANOL LS-770 | 1 | 1 | 1 | 1 |
| Dehydrating agent | Vinyltrimethoxysilane | 2 | 2 | 2 | 2 |
| Adhesiveness-imparting agent | γ-aminopropyltrimethoxysilane | 3 | 3 | 3 | 3 |
| Tin versatate | NEOSTANN U-50 | 5 | 5 | 5 | 5 |

TABLE 4-continued

|  |  | Example 14 | Example 15 | Example 16 | Comparative example 17 |
|---|---|---|---|---|---|
| Promoter | Diethylaminopropylamine | 1 | 1 | 1 | 1 |
| Phosphorus compound having | T-629 | 3 |  |  |  |
| aryl group and melting point of 23° C. or higher | IRGAFOS 168 |  | 1 | 3 |  |
| Surface condition of cured product | After 7 days | good | good | good | good |
|  | After 21 days | good | good | good | crystals found |
|  | After 56 days | good | good | good | crystals found |
| Surface curing rate | (minutes) | 90 | 75 | 75 | 80 |
| Residual tack | After 1 day | good | good | very good | good |
|  | After 7 days | very good | excellent | excellent | very good |
| Depth curability (mm) | After 1 day | 3.1 | 3.5 | 3.4 | 3.2 |
|  | After 7 days | 9.8 | 10.3 | 10.1 | 9.8 |
| Viscosity (Pa · s) | 1 rpm | 2315 | 2315 | 2125 | 2340 |
|  | 2 rpm | 1280 | 1240 | 1200 | 1340 |
|  | 10 rpm | 385 | 360 | 365 | 400 |
| Tensile properties of cured product | M 100 (Mpa) | 0.65 | 0.68 | 0.67 | 0.67 |
|  | TB (Mpa) | 1.64 | 1.82 | 1.68 | 2.05 |
|  | Elongation at break (%) | 560 | 560 | 490 | 655 |

(Surface Condition of Cured Product)

Each curable composition prepared as above was charged in a prepared mold having a thickness of 3 mm so as not to form air bubbles therein and the surface was flattened with a spatula. The composition was cured under conditions of 23° C. and 50% RH, and the surface condition thereof was checked every predetermined days.

(Surface Curing Rate)

Each curable composition was charged in a mold having a thickness of about 5 mm, and the surface was flattened. The time point at which the surface of the charged composition was flattened was defined as the start time of curing. The surface of the composition was touched by a microspatula from time to time, and the time period required for the composition to no longer stick to the microspatula (regarded as skinning time) was determined. The skinning time was measured under conditions of 23° C. and 50% RH.

(Residual Surface Tack)

The same sample as used for evaluating the surface curing rate was placed under conditions of 23° C. and 50% RH and the surface of the cured product was touched with a finger after 1 day and 7 days to evaluate the stickiness. The stickiness was evaluated on a scale of one to eight, excellent, very good, good, satisfactory, satisfactory low, poor, very poor, and failure, beginning with the condition of no stickiness (no stickiness at all was evaluated as "excellent"; high stickiness was evaluated as "failure").

(Viscosity)

Each curable composition was charged in a 100-cc vessel under conditions of 23° C. and 50% RH. The viscosity at 1 rpm, 2 rpm, and 10 rpm was measured with use of a BS-type viscometer with a rotor No. 7 (produced by Tokimec, Inc.)

(Depth Curability)

Each curable composition was charged in a polyethylene tube having a diameter of 12 mm so as not to form air bubbles therein under conditions of 23° C. and 50% RH, and the surface was flattened with a spatula to provide a test sample. The sample was left under the same conditions for seven days and the cured surface thereof was peeled. After the uncured portion was removed completely, the thickness of the cured portion was calipered.

(Tensile Properties of Cured Product)

Each curable composition was charged into a polyethylene mold so as not to form air bubbles therein. The charged composition was cured under conditions of 23° C. and 50% RH for three days and then under conditions of 50° C. for four days to provide a cured sheet having a thickness of 3 mm. A No. 3 dumbbell-shaped specimen was punched out from the cured sheet and subjected to a tensile test under conditions of 23° C. and 50% RH (tensile speed: 200 mm/min) so as to determine the 100% modulus, strength at break, and elongation at break.

As shown in Table 1, curable compositions each containing a phosphorus compound having an aryl group and a melting point of 23° C. or higher provided cured products having a fine appearance without any crystals formed on the surface. In Example 1, a small amount of T-629 resulted in crystallization in 28 days. However, in each of Examples 2 and later, this problem was solved by an increased amount of T-629. Accordingly, a fine appearance can be kept for a long time by using three parts by weight or more of the phosphorus compound having an aryl group for each 100 parts by weight of the component (A). The same effect can be observed in the case of using an aluminum or lithium salt of T-629 or IRGAFOS 168 as a phosphorus compound having an aryl group and a melting point of 23° C. or higher.

Table 2 shows the results in the cases of adding phosphorus compounds containing no aryl groups. As shown in Table 2, crystallization was found on the surface of the cured product at an early stage in each case.

Table 3 shows the evaluation results in the cases of adding phosphorus compounds each having an aryl group and a melting point of less than 23° C. Crystallization was found in each case. Further, the cases of adding Gel All MD and buformin hydrochloride were also evaluated and found that these substances had no positive effects.

Table 4 shows the results as to whether or not addition of a phosphorus compound having an aryl group and a melting point of 23° C. or higher to a sealant including a silyl group-containing organic polymer affects other physical properties. As shown in Table 4, addition of a phosphorus compound having an aryl group and a melting point of 23° C. or higher did not affect the curing rate, viscosity, and depth curability of a one-pack type curable composition and tensile properties of the cured product thereof while the addition suppressed the crystallization problem on the surface of the cured product.

INDUSTRIAL APPLICABILITY

The curable composition of the present invention may be used in applications such as pressure-sensitive adhesives; sealants for uses such as buildings, ships, automobiles, and roads; adhesives; impression materials; vibration-proof materials; damping materials; soundproof materials; expanded/foamed materials; coating compositions; and spray coatings. Since the cured product obtained by curing the curable composition of the present invention is excellent in flexibility and adhesiveness, it is more preferable to use the curable composition as a sealant or an adhesive among these applications.

The curable composition of the present invention may also be used in various applications such as electric and electronic part materials such as back-cover sealants for solar cells; electric insulating materials such as insulating cover materials for electric wires and cables; elastic adhesives; contact adhesives; spray sealants; crack repair materials; tiling adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic-wave-shielding conductive materials and thermally conductive materials; hot melt materials; potting agents for electrics and electronics; films; gaskets; various molding materials; rust-proof and waterproof sealants for wired glass and laminated-glass edges (cut end faces); and liquid sealants for use in automotive parts, electrical machinery parts, various machinery parts, and the like. Further, the curable composition may also be used as various sealing compositions and adhesive compositions as it, either alone or with the aid of a primer, can adhere to a wide range of substrates such as glass, ceramics, wood, metals, and resin moldings. The curable composition of the present invention may also be used for interior panel adhesives, exterior panel adhesives, tiling adhesives, stone pitching adhesives, ceiling finishing adhesives, floor finishing adhesives, wall finishing adhesives, vehicle panel adhesives, adhesives for assembling electric, electronic and precision apparatuses, direct glazing sealants, double glazing sealants, sealants for SSG systems, and working joint sealants for buildings.

The invention claimed is:

1. A curable composition comprising:
(A) an organic polymer having a reactive silyl group;
(B) a carboxylic acid and/or a carboxylate metal salt;
(C) an amine compound having two or more amino groups and no reactive silyl group; and
(D) a phosphorus compound having an aryl group and a melting point of 23° C. or higher.

2. The curable composition according to claim 1, wherein an amount of an organotin compound is less than 0.02% by weight of the composition.

3. The curable composition according to claim 1, wherein the phosphorous compound (D) has two or more aryl groups.

4. The curable composition according to claim 1, wherein the phosphorous compound (D) has an aryl group to which a t-butyl group is bonded.

5. The curable composition according to claim 1, wherein the phosphorus compound (D) contains a phosphorus atom having an oxidation number of +3 or +5.

6. The curable composition according to claim 1, wherein the organic polymer (A) has, as a chain skeleton, at least one polymer selected from the group consisting of a polyoxyalkylene polymer, a saturated hydrocarbon polymer, and a (meth)acrylate ester polymer.

7. The curable composition according to claim 6, wherein the polyoxyalkylene polymer is a polyoxypropylene polymer.

8. The curable composition according to claim 1, wherein the organic polymer (A) has a chain skeleton containing a group represented by the formula (1):

$$-NR^1-C(=O)- \quad (1)$$

wherein $R^1$ is a hydrogen atom or a substituted or unsubstituted organic group.

9. The curable composition according claim 1, wherein the organic polymer (A) is a mixture of a polyoxyalkylene polymer and a (meth)acrylate ester polymer.

10. The curable composition according to claim 1, wherein the component (B) is (B-1) a carboxylic acid including a quaternary carbon atom adjacent to a carbonyl group; and/or
(B-2) a carboxylate metal salt including a quaternary carbon atom adjacent to a carbonyl group.

11. The curable composition according to claim 10, wherein the carboxylate metal salt (B-2) including a quaternary carbon atom adjacent to a carbonyl group is a tin carboxylate.

12. The curable composition according to claim 1, wherein the amine compound (C) is a diamine.

13. The curable composition according to claim 1, wherein the amine compound (C) has one primary amino group and one tertiary amino group in one molecule.

14. A one-pack sealant, which comprises the curable composition according to claim 1.

15. A one-pack adhesive, which comprises the curable composition according to claim 1.

16. A one-pack floor finishing adhesive, which comprises the curable composition according to claim 1.

17. A cured product, which is produced by curing the curable composition according to claim 1.

* * * * *

UNITED STATES PATENT AND TRADEMARK OFFICE
CERTIFICATE OF CORRECTION

PATENT NO. : 8,680,184 B2
APPLICATION NO. : 13/121493
DATED : March 25, 2014
INVENTOR(S) : Ayako Yano It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this
Twenty-ninth Day of September, 2015

Michelle K. Lee
*Director of the United States Patent and Trademark Office*